US011240378B2

(12) United States Patent
Baror et al.

(10) Patent No.: US 11,240,378 B2
(45) Date of Patent: *Feb. 1, 2022

(54) SELECTIVE PERFORMANCE OF AUTOMATED TELEPHONE CALLS TO REDUCE LATENCY AND/OR DURATION OF ASSISTANT INTERACTION

(71) Applicant: Google LLC, Mountain View, CA (US)

(72) Inventors: Yuval Baror, Mountain View, CA (US); Michael Andrew Goodman, Oakland, CA (US); Praveen Krishnakumar, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,270

(22) Filed: May 27, 2021

(65) Prior Publication Data

US 2022/0006900 A1    Jan. 6, 2022

Related U.S. Application Data

(63) Continuation of application No. 16/947,512, filed on Aug. 4, 2020, now Pat. No. 11,050,883, which is a
(Continued)

(51) Int. Cl.
*H04M 3/42* (2006.01)
*H04M 3/51* (2006.01)
(Continued)

(52) U.S. Cl.
CPC ....... *H04M 3/4936* (2013.01); *H04M 3/4283* (2013.01); *H04M 3/5166* (2013.01); *H04M 3/5183* (2013.01); *H04M 2201/39* (2013.01)

(58) Field of Classification Search
CPC ............. G10L 15/22; H04M 3/42042; H04M 3/42059; H04M 3/4283; H04M 3/436;
(Continued)

(56) References Cited

U.S. PATENT DOCUMENTS 5,652,789 A    7/1997   Miner et al.
10,542,143 B2  1/2020   Segalis et al.
(Continued)

OTHER PUBLICATIONS

European Patent Office; International Search Report and Written Opinion of PCT/US2020/064989; 9 pages; dated Mar. 22, 2021.

*Primary Examiner* — Harry S Hong
(74) *Attorney, Agent, or Firm* — Middleton Reutlinger

(57) ABSTRACT

Implementations are directed to using an assistant to initiate automated telephone calls with entities. Some implementations identify an item of interest, identify a group of entities associated with the item, and initiate the calls with the entities. During a given call with a given entity, the assistant can request a status update regarding the item, and determine a temporal delay before initiating another call with the given entity to request a further status update regarding the item based on information received responsive to the request. Other implementations receive a request to perform an action on behalf of a user, identify a group of entities that can perform the action, and initiate a given call with a given entity. During the given call, the assistant can initiate an additional call with an additional entity, and generate notification(s), for the user, based on result(s) of the given call and/or the additional call.

18 Claims, 15 Drawing Sheets

Related U.S. Application Data continuation of application No. 16/947,481, filed on Aug. 3, 2020, now Pat. No. 10,944,867.

(60) Provisional application No. 62/705,586, filed on Jul. 6, 2020.

(51) Int. Cl.
  *G10L 15/22* (2006.01)
  *H04M 3/493* (2006.01)
  *H04M 3/428* (2006.01)

(58) Field of Classification Search
  CPC ............ H04M 3/4936; H04M 3/5158; H04M 3/5166; H04M 3/5183; H04M 2201/39
  USPC .......................... 379/201.01, 201.04, 265.09
  See application file for complete search history.

(56) References Cited

U.S. PATENT DOCUMENTS

| | | | |
|---|---|---|---|
| 10,560,575 | B2 | 2/2020 | Segalis et al. |
| 10,574,816 | B2 | 2/2020 | Segalis et al. |
| 10,582,052 | B2 | 3/2020 | Segalis et al. |
| 10,721,356 | B2 | 7/2020 | Segalis et al. |
| 10,944,867 | B1 * | 3/2021 | Baror ................. H04M 3/5166 |
| 11,050,883 | B1 * | 6/2021 | Baror ................... H04M 3/432 |
| 2002/0032591 | A1 | 3/2002 | Mahaffy et al. |
| 2003/0174830 | A1 | 9/2003 | Boyer et al. |
| 2007/0025542 | A1 | 2/2007 | Bushey |
| 2008/0037720 | A1 | 2/2008 | Thomson et al. |
| 2009/0185556 | A1 | 7/2009 | Kamenetsky et al. |
| 2018/0220000 | A1 | 8/2018 | Segalis et al. |
| 2018/0227418 | A1 | 8/2018 | Segalis et al. |
| 2019/0251959 | A1 | 8/2019 | Engles et al. |
| 2019/0281159 | A1 | 9/2019 | Segalis et al. |
| 2019/0306314 | A1 | 10/2019 | Segalis et al. |
| 2020/0076947 | A1 | 3/2020 | Deole |

* cited by examiner

SELECTIVE PERFORMANCE OF AUTOMATED TELEPHONE CALLS TO REDUCE LATENCY AND/OR DURATION OF ASSISTANT INTERACTION

BACKGROUND

Automated assistants can be interacted with by a user via a variety of computing devices, such as smartphones, tablet computers, wearable devices, automobile systems, stand-alone personal assistant devices, and so forth. The automated assistants receive input from the user (e.g., spoken, touch, and/or typed) and respond with responsive output (e.g., visual and/or audible).

A user can interact with an automated assistant to cause the automated assistant to perform action(s) on behalf of the user. As one example, the automated assistant can place telephone calls on behalf of the user to perform a given action, and can engage in a dialog with an additional user to perform the action(s). For instance, a user can provide inputs that request the automated assistant inquire about an item or service over the phone and on behalf of the user. The automated assistant can initiate an automated telephone call with a particular entity associated with the item or service, and can provide information to an additional user associated with the particular entity to make the inquiry. The automated assistant can then notify the user of a result of the automated telephone call and/or search results associated with the particular entity can be updated based on the result.

However, for some action(s) performed by the automated assistant on behalf of the user, the particular entity may be unable to fully satisfy a request of the user, resulting in wasted computational and/or network resources utilized in performing the action(s). As one example, assume the automated assistant is making the inquiry over the phone and on behalf of the user as described above, and further assume an additional user associated with the particular entity indicates that the item or service is not available. Some automated assistants can determine that the item or service is not available, and simply provide a notification to the user that reflects that the item or service is not available. Accordingly, the computational and/or network resources utilized in performing the automated call are wasted. Further, the user may manually make other telephone call(s) to other entities and/or cause the automated assistant to make other automated telephone call(s) to other entities in an attempt to satisfy the request, causing yet further usage of computational and/or network resources. Yet further, other user(s) may make manual and/or automated calls to the particular entity with the same or similar request that cannot be satisfied by the particular entity, resulting in yet further usage of computational and/or network resources.

SUMMARY

Implementations are directed to using an automated assistant to initiate and perform automated telephone call(s). In some implementations, the automated telephone call(s) can be initiated and performed in response to a request to initiate and perform the automated telephone call(s). The automated assistant can identify a group of entities associated with the request, and can initiate a corresponding automated telephone call with one or more of the entities of the group to perform an action associated with the request. Further, the automated assistant can perform the action associated with the request through rendering instance(s) of synthesized speech related to the request. At least some of the instance(s) of synthesized speech can be generated based on the request and based on processing response(s), during the automated telephone call, that are from a representative of the entity that is participating in the telephone call.

In some implementations, the request to initiate and perform the automated telephone call(s) can be based on analyzing query activity of a plurality of users. The automated assistant can identify, based on analyzing the query activity, term(s) corresponding to an item of interest or service that are included in a threshold number of queries (and optionally across a threshold duration of time). In response to identifying that the term(s) corresponding to the item of interest or the service are included in the threshold number of queries (and optionally across the threshold duration of time), the automated assistant can identify the group of entities associated with the item of interest or service in one or more databases. For example, assume that there is a surge in queries for toilet paper. In this example, the request can be a request for a status update regarding toilet paper at each of the entities of the group, and each of the entities can be identified based on the entities being stored in association with a toilet paper item. In some versions of those implementations, the entities included in the group may be restricted to a particular geographical area from or near (e.g., within 10 miles, 50 miles, or other distance threshold) which the analyzed queries of the query activity originated and/or restricted to a particular type of entity or entities (e.g., pharmacies, supermarkets, convenience stores, grocery stores, etc.) stored in association with the item of interest. Continuing with the above example, further assume that the recent surge of the queries originate from Jefferson County, Ky. In this example, the entities included in the group can be restricted to those that are physically located in Jefferson County, Ky., (or within a threshold distance thereof) and that are stored in association with the toilet paper item. The automated assistant can also intelligently identify the corresponding meaningful types of entities relevant to the item of interest. Continuing the above example, the automated assistant can identify that toilet paper is predominantly sold at entities like supermarkets, convenience stores, grocery stores, etc., and the relevant stores in Jefferson County, Ky. would be included in the group of entities.

In some versions of those implementations, each of the entities of the group may be called in parallel using instance(s) of the automated assistant. During each of the automated telephone call(s), the action associated with the request can be performed through rendering the instance(s) of the synthesized speech (e.g., requesting the status update), and information can be received from a representative associated with a corresponding one of the entities responsive to the synthesized speech. Further, the automated assistant can determine a temporal delay before initiating a subsequent additional corresponding automated telephone call with the given entity to perform the action again. Moreover, the automated assistant can initiate the subsequent additional corresponding automated telephone call with the given entity to perform the action again responsive to determining that the temporal delay has lapsed.

For example, assume the request is a request for a status update regarding toilet paper at each of the entities of the group, and assume that the representative associated with the given entity indicates that the given entity has enough toilet paper to last for three days. In this example, the automated assistant can assign a time period of 72 hours as the temporal delay based on the information received form the representative. Accordingly, the automated assistant will not initiate a subsequent corresponding automated telephone call with the given entity until the time period of 72 hours has lapsed. In contrast, assume that the representative associated with the given entity indicates that the given entity might not have enough toilet paper to last the rest of the day. In this example, the automated assistant can assign a time period of four hours as the temporal delay based on the information received form the representative. Accordingly, the automated assistant will initiate a subsequent corresponding automated telephone call with the given entity later that same day. In these and other manners, a corresponding temporal delay can be dynamically determined for each entity based on information received during automated telephone call(s) with the entity. Dynamically determining the temporal delay in such manners can balance the technical benefits achieved with maintaining up-to-date information from the entity with the resources utilized in initiating and performing the automated telephone call(s). Put another way, dynamically determining the temporal delay can prevent another automated phone call to the entity from being performed too quickly, which leads to unnecessary utilization of computational and/or network resources—while ensuring that information from the entity is up-to-date.

In other implementations, the request to initiate and perform the automated telephone call(s) can be based on user input from a user of a computing device associated with the automated assistant. The automated assistant can identify, based on processing the user input, an item of interest or service associated with the request. In response to identifying the item of interest or the service in the user input, the automated assistant can identify the group of entities associated with the item of interest or service in one or more databases. For example, assume the user of the computing device provides user input of "find me a roofer". In this example, the request can be a request for availability regarding a roofer from each of the entities of the group, and each of the entities can be identified based on the entities being stored in association with a roofing item. In some versions of those implementations, the entities included in the group may be restricted to those within a threshold distance of a location of the computing device of the user. Continuing with the above example, the entities included in the group can be restricted to those that are within ten miles of the location of the computing device of the user, and that are stored in association with the roofing service. If there are no entities included in the group, then the threshold distance may be increased until one or more entities are included in the group.

In some versions of those implementations, each of the entities of the group may be called in a staggered manner using instance(s) of the automated assistant. The automated assistant can initiate a first automated telephone call with a first one of the entities of the group. The action associated with the request can be performed through rendering the instance(s) of the synthesized speech (e.g., requesting the status update, requesting availability of the service, and/or other actions), and information can be received from a representative associated with the first entity of the group responsive to the synthesized speech. Further, the automated assistant can determine a call initiation time associated with each of the other entities of the group. As described in greater detail herein (e.g., with respect to FIG. 1), the call initiation time can be a set duration of time after initiating each of the automated telephone call(s), determined based on historical call data associated with each of the entities of the group, determined based on progress on the automated telephone call(s), and/or other data related to the automated telephone call(s). The automated assistant can continue initiating the automated telephone call(s) with the entities of the group until the request is satisfied.

Moreover, the automated assistant can generate notification(s) based on a result of one or more of the automated telephone call(s), such that one or more notifications can be rendered for each of the automated telephone calls initiated and performed by the automated assistant. Further, the automated assistant can cause the computing device of the user to audibly and/or visually render the notification(s) at the computing device of the user. In some further versions of those implementations, the notification(s) can include prompt(s) requesting that the user of the computing device authorize providing of user information to the representative associated with the given entity. As described herein, in various implementations the call initiation times utilized in staggering the automated calls can be determined in view of seeking to lessen latency with which the notification(s) are provided and/or to lessen the overall duration of the interaction of the user with the automated assistant. In many of those implementations, the call initiation times are further determined in view of seeking to mitigate unnecessarily calling and/or unnecessarily prolonging call duration with a later called entity or entities (e.g., in the situation where an earlier called entity can satisfy the action). Determining the call initiation times in such manner(s) can balance the technical benefits achieved with lessening latency and/or interaction duration with the resources utilized in performing automated telephone calls.

In various implementations, the result(s) associated with the entities of the group can be updated based on the information obtained during the automated telephone call(s). For example, assume that the request is a request for a corresponding status update regarding a toilet paper item that originates from an information retrieval system like a search interface. Further assume first information received from a first representative associated with a first entity indicates that the first entity has enough toilet paper to last for three days, and that second information received from a second representative associated with a second entity indicates that the second entity might not have enough toilet paper to last the rest of the day. In this example, the result(s) associated with the first entity and the second entity can be updated to include a respective indication of the information received during the automated telephone call(s). In some versions of those implementations, the updated result(s) may further include a temporal indication of when the information was received. In these and other manners, users are provided with an indication of information for an entity, and optionally a temporal indication of the information, which can at least selectively prevent the user from manually calling the entity to seek such information and/or causing an automated call to be initiated for the entity to seek such information and/or can mitigate risks of a user travelling to and from a location associated with an entity. At least in the aggregate and across a large population of users, this can lessen the overall quantity of phone calls to the entity, thereby conserving network resources and/or computational resources that would otherwise be utilized in such calls.

The above description is provided as an overview of only some implementations disclosed herein. Those implementations, and other implementations, are described in additional detail herein.

DETAILED DESCRIPTION

Figure 1:
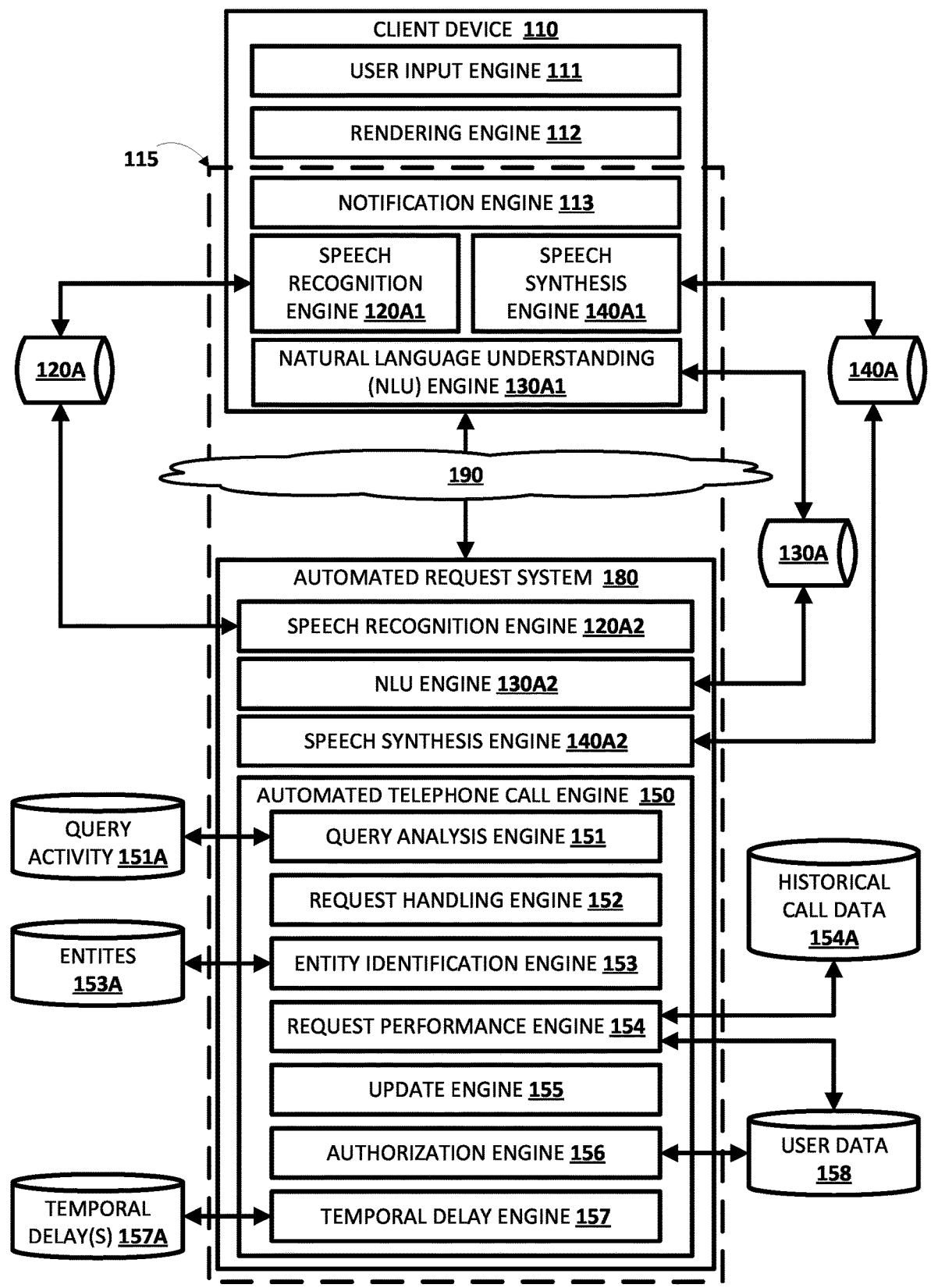
FIG. 1 depicts a block diagram of an example environment that demonstrates various aspects of the present disclosure, and in which implementations disclosed herein may be implemented.

FIG. 1 illustrates a block diagram of an example environment that demonstrates various aspects of the present disclosure. A client device 110 is illustrated in FIG. 1, and includes, in various implementations, user input engine 111, rendering engine 112, notification engine 113, speech recognition engine 120A1, natural language understanding ("NLU") engine 130A1, and speech synthesis engine 140A1.

The user input engine 111 can detect user input at the client device 110. The user input detected at the client device 110 can include spoken input detected via microphone(s) of the client device 110 and/or additional spoken input transmitted to the client device 110 from an additional client device of an additional user (e.g., during an automated telephone call), touch input detected via a user interface of the client device 110, and/or typed input detected via a user interface of the client device 110. The additional user can be, for example, a human representative associated with an entity, an automated assistant associated with the entity, an interactive voice response system ("IVR" system) associated with the entity, and/or a combination thereof. The automated telephone calls described herein can be performed using various voice communication protocols including, for example, Voice over Internet Protocol (VoIP), public switched telephone network (PSTN), and/or other telephonic communication protocols. Moreover, the automated telephone calls described herein can be initiated and performed using an automated assistant 115 that is executed locally at the client device 110 (e.g., a local assistant), remotely at one or more servers (e.g., a cloud-based assistant), and/or a combination thereof (e.g., as indicated by dashed lines in FIG. 1).

In various implementations, the automated assistant 115 can initiate and perform the automated telephone calls using automated request system 180. In implementations where the automated assistant 115 is executed locally at the client device 110, the automated request system 180 can be executed locally on the client device 110 such that the automated telephone calls are initiated and performed using only resources of the client device 110. In implementations where the automated assistant 115 is executed remotely at one or more of the servers, the automated request system 180 can be executed remotely at one or more of the servers such that the automated telephone calls are initiated and performed using only resources of one or more of the servers. In implementations where the automated assistant 115 is executed in a distributed manner as shown in FIG. 1, the automated request system 180 can be executed remotely at one or more of the servers in communication with the client device 110 over network(s) 190. The network(s) 190 can include, for example, Wi-Fi, Bluetooth, near-field communication, local area network(s), wide area network(s), other networks, and/or any combination thereof.

The automated request system 180 includes, in various implementations, speech recognition engine 120A2, NLU engine 130A2, speech synthesis engine 140A2, and automated telephone call engine 150. Further, the automated telephone call engine 150 includes, in various implementations, query analysis engine 151, request handling engine 152, entity identification engine 153, request performance engine 154, update engine 155, and authorization engine 156, and temporal delay engine 157.

In some implementations, the automated assistant 115 can initiate and perform automated telephone calls, using the automated request system 180, in response to detecting user input, from a given user of the client device 110 and via the user input engine 111, that includes a request to initiate the automated telephone calls. The user input can include typed input or touch input detected via a touchscreen or keyboard of the client device 110, and/or spoken input detected via microphone(s) of the client device 110. In implementations where the user input engine 111 detects typed input or touch input, the client device 110 can transmit an indication of the detected user input to the request handling engine 152 of the automated telephone call engine 150 over the network(s) 190. For example, the user input engine 111 can detect typed input or touch input via a search interface, an automated assistant interface, and/or other interfaces of the client device 110, determine that the detected user input is directed to initiating and performing the automated telephone calls, and transmit the detected user input to the request handling engine 152 of the automated telephone call engine 150 for further processing of the detected user input.

In implementations where the user input engine 111 detects spoken input of a given user via the microphone(s) of the client device 110, the speech recognition engine 120A1 of the client device 110 can process, using speech recognition model(s) 120A, audio data generated by the microphone(s) that captures the spoken input to generate recognized text corresponding to the spoken input. Further, the NLU engine 130A1 of the client device 110 can process, using NLU model(s) 130A, the recognized text generated by the speech recognition engine 120A1 to determine intent(s) included in the spoken input. For example, if the client device 110 detects spoken input of "find toilet paper near me" from the given user, the client device 110 can process, using the speech recognition model(s) 120A, audio data that captures the spoken input to generate recognized text corresponding to the spoken input, and can process, using the NLU model(s) 130A, the recognized text to determine at least an intent of finding toilet paper proximate to a current location of the given user as an action included in the request to initiate and perform the automated telephone calls. In some versions of those implementations, the client device 110 can transmit the recognized text corresponding to the spoken input and/or the intent(s) determined based on the spoken input to the request handling engine 152 of the automated telephone call engine 150 for further processing of the recognized text and/or intent(s).

In other implementations when the user input engine 111 detects spoken input of the given user via the microphone(s) of the client device 110, the automated assistant 115 can cause the client device 110 to transmit the audio data that captures the spoken input to the automated request system 180. The speech recognition engine 120A2 and/or the NLU engine 130A2 of the assisted call system 180 can process the audio data that captures the spoken input in a similar manner described above with respect to the speech recognition engine 120A1 and/or the NLU engine 130A1 of the client device 110. Further, the spoken input and/or the intent(s) determined based on the spoken input to the request handling engine 152 of the automated telephone call engine 150 for further processing of the recognized text and/or intent(s). In some additional and/or alternative implementations, the speech recognition engine 120A1 and/or the NLU engine 130A1 of the client device 110 can be used in the conjunction with the speech recognition engine 120A2 and/or the NLU engine 130A2 of the automated request system 180 in a distributed manner. Moreover, the speech recognition model(s) 120A and/or the NLU model(s) 130A can be stored locally on the client device 110, remotely at the automated request system 180, and/or remotely at other server(s) in communication with the client device 110 and/or the automated request system 180 over the network(s) 190.

In various implementations, the speech recognition model(s) 120A are end-to-end speech recognition model(s), such that the speech recognition engine(s) 120A1 and/or 120A2 can generate recognized text corresponding to the spoken input directly using the model. For instance, the speech recognition model(s) 120A can be an end-to-end model(s) used to generate the recognized text on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency Cepstral coefficients (MFCCs) or other representation) to generate predicted output, an RNN-T model can be used to continuously process input samples and stream output symbols (e.g., characters of the alphabet). Also, for example, when the speech recognition model(s) are not an end-to-end speech recognition model(s), the speech recognition engine(s) 120A1 and/or 120A2 can instead generate predicted phoneme(s) (and/or other representations). For instance, with such models the predicted phoneme(s) (and/or other representations) are then utilized by the speech recognition engine(s) 120A1 and/or 120A2 to determine recognized text that conforms to the predicted phoneme(s). In doing so, the speech recognition engine(s) 120A1 and/or 120A2 can optionally employ a decoding graph, a lexicon, and/or other resource(s).

In some additional and/or alternative implementations, the automated assistant 115 can initiate and perform the automated telephone calls, using the automated request system 180, without detecting any user input via the user interface input engine 111. In some implementations, the query analysis engine 151 can analyze query activity stored in query activity database 151A, and can transmit a request to initiate and perform the automated telephone calls in response to determining one or more conditions are satisfied. The query activity analyzed by the query analysis engine 151 can include queries submitted to a search engine (e.g., via a search interface or automated assistant interface) by a plurality of users using respective client devices. In some versions of those implementations, the one or more conditions can include determining whether a threshold number of queries for a given item or service have been submitted by the plurality of users. For example, if the query analysis engine 151 determines, based on analyzing the query activity of the plurality of users using, that the plurality of users have submitted 30,000 queries for "toilet paper", or variants thereof (e.g., "TP", "bathroom tissue", and so on), exceeds the threshold number of queries for the given item (e.g., toilet paper), then automated assistant 115 may transmit a request to initiate and perform the automated telephone calls to the request handling engine 152. In some versions of those implementations, the query activity may be restricted to queries submitted by users in a particular geographic region. For example, the query activity may be restricted to queries submitted by users in a particular zip code, county, municipality, town, city, state, country, and/or other geographic regions.

In some further versions of those implementations, the one or more conditions can include determining whether the threshold number of queries for a given item or service have been submitted by the plurality of users within a given time frame. Continuing with the above example, if the query analysis engine 151 determines that the 30,000 queries for "toilet paper", or variants thereof, are submitted over a period of two weeks, then the automated assistant may not transmit the request to the request handling engine 152. However, if the query analysis engine 151 determines that the 30,000 queries for "toilet paper" are submitted over a period of two days, then the automated assistant may not transmit the request to the request handling engine 152. In this manner, the query analysis engine 151 can detect whether there is an increase in queries for the given item across a particular period of time. Moreover, in various implementations, the query analysis engine 151 may only analyze a subset of the submitted queries in the query activity database 151A, such as those that seek to find or acquire the item of interest as opposed to that merely mention "toilet paper" or variants thereof. In this manner, the query analysis engine 151 can identify surges in submitted queries from particular geographic regions.

The request handling engine 152 can process the received request to determine action(s) associated with the request. The action(s) associated with the request can include requesting status updates regarding an item of interest at a given entity, requesting availability of a given entity associated with a particular service during a period of time, and/or other actions that can be performed by the automated assistant 115 during the automated telephone calls. In implementations where the request is based on user input detected at the client device 110 via the user input engine 111, the request handling engine 152 can determine the action(s) associated with the request based on the indication of the typed input and/or touch input, and/or the generated recognized text and/or determined intent(s) from the spoken input. For example, if the user input detected via the user input engine 111 is spoken input of "find an electrician that can work on my house tomorrow at 12:00 PM", then the request handling engine 152 can determine the action(s) include calling electrician(s) to request availability of the electrician(s) for tomorrow at 12:00 PM based on the generated recognized text and/or the determined intent(s). In implementations where the request is based on analyzing the query activity without detecting any user input at the client device 110 via the user input engine 111, the request handling engine can determine the action(s) associated with the request based on the given item or service included in the queries. For example, if the query analysis engine 151 determines that 5,000 queries including the terms "hand sanitizer" have been submitted by users in Jefferson County, Ky. within a one hour period, then the request handling engine 152 can determine the action(s) include calling entities that are stored in association with hand sanitizer in Jefferson County, Ky. to request status updates regarding the availability of the hand sanitizer at each of the entities.

The entity identification engine 153 can identify a group of entities to engage with during the automated telephone calls. The entities can be, for example, a person entity, a business entity, a location entity, and/or other entities. In some implementations, the entity identification engine 153 can also determine a particular type of the entities to be included in the group. For example, a type of the person entity can be a friend entity, a family member entity, a co-worker entity, and/or other particular types of person entities. Further, a type of the business entity can be a service provider entity, an airline entity, a hotel entity, a retail store entity, and/or other particular types of business entities. Moreover, a type of the location entity can be a school entity, a museum entity, a library entity, and/or other particular types of location entities. In some implementations, the entity identifying engine 153 can also determine a specific entity for the identified entity. For example, a specific entity for a person entity can be a name of the person (e.g., John Doe, Example Plumber 1, etc.), a specific entity for a business entity can be a name of the business (e.g., Example Super Store, Hypothetical Toy Store, Example Plumbing Company, etc.), and a specific entity for a location entity can be a name of the location (e.g., Hypothetical Library, Example State Park, etc.). Although the entities described herein can be defined by various levels of granularity, they are collectively referred to herein as "entities" for the sake of simplicity.

Each of the entities identified by the entity identification engine 153 can be stored in entities database 153A. Further, each of the entities can be stored in the entities database 153A in association with item(s) that they are associated with, service(s) that they are associated with, location(s) that they are associated with, webpages that they are associated with, and/or other data associated with each of the entities. In some implementations, the entities database 153A can be populated with the entities and the associated data using a web crawler. For example, if a given entity is Hypothetical Toy Store, then a web crawler can crawl the web page(s) associated with the Hypothetical Toy Store to identify each location of the Hypothetical Toy Store, available inventory of particular items at the Hypothetical Toy Store, and operating hours of the Hypothetical Toy Store, and store this data in association with the Hypothetical Toy Store in the entities database 153A. As another example, if a given entity is Hypothetical Café, then a web crawler can crawl the web page(s) associated with the Hypothetical Café to identify each location of the Hypothetical Café, menu items available at the Hypothetical Café, and operating hours of the Hypothetical Café, and store this data in association with the Hypothetical Café in the entities database 153A. In this manner, the entities database 153A includes a mapping between each of the entities stored therein and the data associated therewith. In some additional and/or alternative implementations, the entities, or users that visit the entities, can provide an indication of items that are associated with the entity.

In implementations where the request is based on received user input detected at the client device 110 via the user input engine 111, the entity identification engine 153 can identify the group of entities that are each capable of satisfying the request in response to receiving the user input. The entity identification engine 153 can initially identify each of the entities that are stored in association with the given item or service, in the entities database 153A, included in the request as an initial group of entities that are each capable of satisfying the request. Further, the entity identification engine 153 can identify a location of the client device 110 based on location data generated by one or more sensors of the client device 110 (e.g., GPS), and can determine which of the entities in the initial group are within a threshold distance of the location of the client device 110. Moreover, the entity identification engine 153 can include the entities that are within the threshold distance of the location of the client device 110 and that are capable of satisfying the request in the group of entities. For example, if the user input detected at the client device 110 is spoken input of "find paper towels", then the entity identification engine 153 can identify a current location of the client device 110, identify entities that are stored in association with paper towels in the entities database 153A, determine which of the identified entities are within a ten mile radius of the current location of the client device 110, and include each of the entities that are associated with paper towels and that are within the ten mile radius of the current location of the client device 110 in the group of entities.

In some versions of those implementations, the initially identified entities may be restricted to those that are stored in association with locations that are within the threshold distance of the location of the client device 110. Continuing with the above example, only entities that are stored in association with paper towels and are within the ten mile radius of the client device 110 may be considered for inclusion in the group. In some versions of those implementations, the entity identification engine 153 may only include a threshold number of entities in the group. For instance, if the number of entities in the group exceed the threshold number of entities, then only the entities that satisfy one or more criteria may be included in the group. The one or more criteria can include, for example, a locational criteria, a temporal criteria, a rating criteria, a user preferences criteria, and/or other criteria. Continuing with the above example, if there are ten entities that are associated with paper towels and that are within the ten mile radius of the current location of the client device 110, then only the five closest entities, the five highest-rated entities, and/or the five entities that are currently open as indicated by the operating hours, or the five entities that the user of the client device 110 has visited in the past or frequently visits. In some additional and/or alternative versions of those implementations, the entity identification engine 153 may identify an additional group of entities if the request cannot be satisfied by any of the entities in the group of entities. The threshold distance may be modified in response to determining that none of the entities of the group can satisfy the request. Continuing with the above example, if none of the five entities in the group have paper towels available, then five additional entities within the ten mile radius can be included in the additional group or the ten mile radius can be expanded to fifteen miles or larger if there are not five additional entities within the ten mile radius. In this manner, the entities that are identified in response to the user input are personal to the user that provided the user input.

In implementations where the request is based on analyzing query activity via the query analysis engine 151, the entity identification engine 153 can identify the group of entities that are each capable of satisfying the request in response to receiving the request. The entity identification engine 153 can identify each of the entities that are stored in association with the given item or service, in the entities database 153A, included in the request as the group of entities that are each capable of satisfying the request. For example, if the query analysis engine 151 determines that there is a recent surge in submitted queries that include the terms "Hot Christmas Toy 2020", then each the entities stored in association with Hot Christmas Toy 2020 can be included in the group of the entities. In some versions of those implementations, the entity identification engine 153 can identify a particular geographic region from which the queries in the query activity were submitted. Moreover, the entity identification engine 153 can include the entities that are within the particular geographic region and that are capable of satisfying the request in the group of entities. Continuing with the above example, if the query analysis engine 151 determines the recent surge in queries for Hot Christmas Toy 2020 originated in San Francisco County, Calif., then the entity identification engine 153 can restrict the entities in the group to only those stored in association with a location within San Francisco Country, Calif. In this manner, the entities that are identified in response to the recent surge of the submitted queries are personal to the particular geographic region from which the queries originated.

The request performance engine 154 can initiate and perform corresponding automated telephone calls with the entities of the group identified by the entity identification engine 153. More particularly, each of the automated telephone calls described herein can be initiated and performed using various voice communication protocols including, for example, Voice over Internet Protocol (VoIP), public switched telephone network (PSTN), and/or other telephonic communication protocols. Moreover, each of the automated telephone calls described herein can be between the automated assistant 115 and a representative associated with a given entity, of the entities, of the group. The representative can be, for example, a human representative associated with the given entity, an additional automated assistant associated with the given entity, an IVR system associated with the given entity, and/or any combination thereof.

More particularly, the request performance engine 154 can cause the automated assistant 115 to engage in a conversation, with the representative associated with the given entity, using synthesized speech, during the automated telephone call to perform the action(s) included in the request. The request performance engine 154 can provide text and/or phonemes related to performance of the request to the speech synthesis engine 140A1 of the client device 110 and/or the speech synthesis engine 140A2 of the assisted call system 180 to generate synthesized speech audio data. The synthesized speech audio data can be transmitted, for audible rendering, to an additional client device of the representative associated with the given entity. The speech synthesis engine(s) 140A1 and/or 140A2 can generate, using speech synthesis model(s) 140A, the synthesized speech audio data that includes synthesized speech corresponding to the text and/or phonemes related to performance of the request. For example, assume that the request is for a request for a status update regarding "Hot Christmas Toy 2020." In this example, the speech synthesis engine(s) 140A1 and/or 140A2 can determine a sequence of phonemes that correspond to a status update of "do you have Hot Christmas Toy 2020 available for sale," and can process the sequence of phonemes, using the speech synthesis model(s) 140A, to generate synthesized speech audio data that captures the request for the status update regarding the Hot Christmas Toy. The synthesized speech audio data can be, for example, in the form of an audio waveform. In determining the sequence of phonemes that correspond to at least the phonemes related to performance of the request, the speech synthesis engine(s) 140A1 and/or 140A2 can access a tokens-to-phonemes mapping stored locally at the client device 110 or stored remotely at server(s) via network(s) 190.

In various implementations, prior to performance of the request during the corresponding automated call with the given entity, the automated assistant 115 can obtain consent from the representative associated with the given entity to engage in a conversation with the automated assistant 115. For example, the automated assistant 115 can obtain consent upon initiating the automated telephone call by identifying itself as the automated assistant 115 and prompting the representative associated with the given entity to consent to engaging in the conversation with the automated assistant. If the automated assistant 115 obtains consent from the representative associated with the given entity, then the automated assistant 115 can perform, using the automated request system 180, the action included in the request. Further, the automated assistant may not prompt the representative in any subsequent automated telephone calls once consent has been obtained. However, if the automated assistant 115 does not obtain consent from the representative, then the automated assistant 115 can terminate the automated telephone call.

The request performance engine 154 can engage in the conversation with the representative associated with the given entity by rendering corresponding instances of synthesized speech related to the request. Rendering of the corresponding instances of the synthesized speech includes causing the synthesized speech to be rendered at an additional computing device of the representative associated with the given entity. The corresponding instances of the synthesized speech can be generated using the speech synthesis model(s) 140A as described above, and can be generated based on text and/or phonemes associated with the request. Moreover, the request performance engine 154 can utilize the speech recognition engine(s) 120A1 and/or 120A2 and NLU engine(s) 130A1 and/or 130A2 as described above to process any audio data corresponding to information received from the representative associated with the given entity during the given entity. The request performance engine 154 can cause the automated assistant 115 to steer the conversation based on the received information during the conversation with the representative. For example, the automated assistant 115 can initially verify that the given entity is capable of satisfying the request. If the given entity verifies that it is capable of satisfying the request, then the automated assistant 115 can further inquire as to satisfying the request. However, if the given entity indicates that is not capable of satisfying the request, then the automated assistant 115 may terminate the telephone call. This allows the automated assistant 115 to intelligently respond based on the received information during the automated telephone call.

For example, assume the request is a request for a status update regarding availability of latex gloves. In this example, synthesized speech audio data of "do you have any latex gloves available" can be rendered at an additional client device of the representative, the representative may provide information of, for example, "yes" or "no", and audio data that captures the received information can be processed. Based on processing the received audio data, the automated assistant 115 can steer the conversation. For example, if the representative indicates that latex gloves are available at the given entity, then the request performance engine 154 may further request an available amount of the latex gloves, whether the given entity anticipates the latex gloves being available the rest of the day, and so on. However, if the representative indicates that latex gloves are available at the given entity, then the request performance engine 154 can cause the automated assistant 115 to terminate the conversation. Engaging in the conversation with the representative associated with the given entity is described in greater detail herein (e.g., with respect to FIGS. 4A-4C, 5B-5D, and 6B-6C).

In implementations where the request is a request for a corresponding status update regarding a given item, the update engine 155 can cause result(s) associated with the given entity to be updated based on the information received during a corresponding automated telephone call with the representative associated with the given entity. Notably, the result(s) associated with the given entity can be updated whether the request is based on received user input detected via the user input engine 111 or based on analyzing query activity via the query analysis engine 151. The updated result(s) associated with the given entity can include, for example, an indication of whether the given item is available at the given entity, an indication of an available quantity of the item at the given entity, and/or other information received during the corresponding automated telephone call with the representative associated with the given entity. Notably, the result(s) (also referred to herein as "search results") can include any results that can be surfaced to users through various interfaces. For example, the results can be presented via an information retrieval system interface, an automated assistant interface, a maps or navigation application interface, a customized interface, and/or any other interface used to surface information to a user.

For example, assume the request is a request for a status update regarding toilet paper. In this example, the automated assistant 115 can engage in a conversation with a representative associated with a given entity to request the status update regarding toilet paper at a given entity. Further assume, during the conversation, that a representative associated with the given entity provides information that indicates the given entity has toilet paper available, and also provides information as to an indication of an available quantity of toilet paper (e.g., "we have plenty for the rest of the day", "we have 100 packages of toilet paper", "we will run out before noon", and so on). Based on this received information, the update engine can cause the result(s) associated with the given entity to be updated to include an indication that the given entity has toilet paper available and the indication of the available quantity of toilet paper. In contrast with the above example, assume the received information from the representative associated with the given entity indicates that the entity does not sell toilet paper. In this example, the result(s) associated with the given entity can be updated to indicate that the given entity is not associated with toilet paper. Further, the update engine 155 can transmit an indication that the given entity is no longer associated with toilet paper, and the entity identification engine 153 can remove the association between toilet paper and the given entity in the entities database 153A.

In some versions of those implementations, the updated result(s) associated with the given entity can also include a temporal indicator of when the information was received from the representative associated with the given entity. The temporal indicator can include, for example, a particular time that the information was received (e.g., 9:00 AM, 2:00 PM), a particular date that the information was received (e.g., yesterday, today, Jun. 11, 2020), a date range the information was received (e.g., last week, yesterday morning, this afternoon), and/or any combination thereof. Updating the result(s) associated with multiple entities based on information received during corresponding automated calls is described in greater detail herein (e.g., with respect to FIGS. 4A-4D). By updating the result(s) associated with the given entity, multiple users need not call the given entity to request the status update regarding the item, thereby conserving computational resources of client devices of the multiple users and computational resources of client device(s) associated with the given entity. Put another way, a single automated phone call and provisioning of information from the single automated phone call to multiple users, can prevent at least two or more of the multiple users from making a call to the given entity seeking such information. Moreover, by updating the result(s) associated with the given entity, multiple users need not travel to multiple entities in search of the item, thereby conserving natural resources consumed in transportation to the multiple entities by the multiple users in search of the item.

In some versions of those implementations, the update engine 155 can also analyze the updated result(s) associated with the given entity and previously updated results associated with the given entity to predict, for a future time, future availability of the item at the given entity or future available quantities of the item at the given entity. The update engine 155 can predict, for the future time, the future availability of the item at the given entity or the future available quantities of the item at the given entity using, for example, machine learning prediction model(s) or rule(s) generated by machine learning prediction model(s). For example, the update engine 155 can determine, based on analyzing updated results associated with the given entity, that the given entity has not had any toilet available for the past three Thursdays and Fridays, but that the given entity has had toilet paper available each of the past three Saturdays. Based on this determination, the update engine 155 can predict that the given entity will not have any toilet paper available this upcoming Thursday or Friday, but will have toilet paper available the following Saturday. Accordingly, at the beginning of the week, the update engine 155 can cause the result(s) to be updated to also include an indication that it is anticipated the given entity will not have any toilet paper available on Thursday or Friday, but will have toilet paper available on Saturday.

In implementations where the request is based on received user input detected at the client device 110 via the user input engine 111, the request performance engine 154 can initiate an automated telephone call with an entity, of the entities, of the group to perform the action included in the request. The request performance engine 154 can determine a call initiation time to initiate performance of additional automated telephone calls with additional entities of the group. Further, the request performance engine 154 can determine each call initiation time prior to or during the automated telephone calls. In some versions of those implementations, the call initiation time can be a static threshold duration of time (e.g., 15 seconds, 30 seconds, 45 seconds, and/or other durations of time). For example, the request performance engine 154 can cause the automated assistant 115 to initiate a first automated telephone call with a first entity of the group, initiate a second automated telephone call with a second entity of the group 30 seconds after initiating the first automated telephone call with the first entity, initiate a third automated telephone call with a third entity of the group 30 seconds after initiating the second automated telephone call with the second entity, and so on for each of the entities of the group.

In other versions of those implementations, the request performance engine 154 can determine each call initiation time based on historical call data (e.g., stored in historical call database 154A) associated with a corresponding one of the entities of the group and/or a complexity of the request. The historical call data can include, for example, an indication that the corresponding entity is associated with an IVR system and a duration of time to navigate the IVR system, an indication of a duration of time of previous automated telephone calls with the corresponding entity, an indication of a duration of an initial hold time during previous automated telephone calls with the corresponding entity, and/or other call data derived from previous automated telephone calls with each corresponding entity of the group. As one non-limiting example, if the historical call data indicates that a first entity of the group is not associated with an IVR system or any hold time but a second entity of the group is associated with an IVR system that takes 20 seconds to navigate, then the request performance engine 154 can cause the automated assistant 115 to simultaneously initiate (e.g., at the same time or within a threshold amount of time (e.g., 500 milliseconds, 1 second, and/or other amounts of time)) a first automated telephone call with the first entity of the group initiate a second automated telephone call with the second entity of the group. As another non-limiting example, if the historical call data indicates that a first entity of the group is associated with an IVR system that takes 10 seconds to navigate and a second entity of the group is associated with an IVR system that takes 30 seconds to navigate, then the request performance engine 154 can cause the automated assistant 115 to initiate a first automated telephone call with the first entity of the group and initiate a second automated telephone call with the second entity of the group after 10 seconds. As yet another non-limiting example, if it is predicted that it will take 45 seconds to perform the request based on the complexity of the request and if the historical call data indicates that a first entity of the group is not associated with an IVR system (or any hold time), but a second entity of the group is associated with an IVR system that takes 20 seconds to navigate, then the request performance engine 154 can cause the automated assistant 115 to initiate a second automated telephone call with the second entity of the group 25 seconds after initiating a first automated telephone call with the first entity. In this example, the automated assistant may be afforded enough time to perform the request with the first entity (e.g., 45 seconds), and initiate the second automated telephone call with the second entity such that a representative associated with the second entity should be active for the second call after performance of the first automated telephone call based on the 20 seconds to navigate the IVR and the 25 second delay for the call initiation time being equal to the 45 seconds to perform the request. Further, this also provides the automated assistant an opportunity to terminate the second automated telephone call with the second entity if the first entity indicates that it can satisfy the request. In contrast with this example, assume that the first entity is associated with the IVR system that takes 20 seconds to navigate and the second entity is not associated with an IVR system or hold time. In this example, the call initiation time for the second automated telephone call with the second entity may be 65 seconds to allow the automated assistant 20 seconds to navigate the IVR system and perform the action prior to initiating the second automated telephone call with the second entity. The call initiation time can be determined in this dynamic manner for each of the entities of the group.

In various implementations, the call initiation times utilized in staggering the automated call(s) can be determined in view of seeking to lessen latency with which the notification(s) are provided (e.g., as described below with respect to the notification engine 113) and/or to lessen the overall duration of the interaction of the user with the automated assistant. In many of those implementations, the call initiation times are further determined in view of seeking to mitigate unnecessarily calling and/or unnecessarily prolonging call duration with a later called entity or entities (e.g., in the situation where an earlier called entity can satisfy the action). Determining the call initiation times in such manner(s) can balance the technical benefits achieved with lessening latency and/or interaction duration with the resources utilized in performing automated telephone calls. For example, by staggering the automated telephone call(s), entities can be selectively called until the request included in the user input is satisfied and without initiating and performing automated telephone call(s) with each entity of the group. Moreover, the automated assistant is connected with the representative associated with each of the entities at an appropriate time such that the automated assistant need not wait for a first automated telephone call to be concluded to initiate a second automated telephone call and wait on hold or navigate an IVR, thereby lessening the interaction duration in performing the automated telephone call(s).

In implementations where the request is based on received user input detected at the client device 110 via the user input engine 111, the request performance engine 154 can continue initiating the automated telephone calls with the entities of the group in either manner described above until the request is satisfied by one of the entities of the group. In some versions of those implementations, the request performance engine 154 can cause the automated assistant 115 to proactively terminate automated telephone calls with other entities once a representative associated with a given entity indicates that the given entity can satisfy the request. For example, assume that a representative associated with a first entity of the group provides information that indicates the first entity can satisfy the request and a second automated call with a second entity of the group has been initiated. In this example, the request performance engine 154 can cause the automated assistant to terminate the second automated call with the second entity since the first entity can satisfy the request.

In other versions of those implementations, the request performance engine 154 may continue performance of the additional automated telephone call, rather than proactively terminate the additional automated telephone call, even though the representative of the given entity of the automated telephone indicated that the given entity can satisfy the request. For instance, if the additional automated telephone call has progressed past a threshold stage, then the request performance engine 154 can cause the automated assistant 115 to continue performance of the conversation with the additional entity. For example, the request is a request for a status update regarding hand sanitizer, and further assume the automated assistant 115 is engaged in a conversation with a representative associated with a first entity of the during a first automated telephone call and has already initiated a second automated telephone call with a second entity of the group. In this example, if a representative associated with the first entity indicates that the first entity has hand sanitizer available and the automated assistant 115 is on hold with the second entity or navigating an IVR system associated with the second entity, then the automated assistant 115 can terminate the second automated telephone call. However, if the automated assistant is already engaged in a conversation with a representative associated with the second entity, then the automated assistant 115 may continue performance of the second automated telephone call. Further, the update engine 155 can cause the search result(s) associated with the second entity to be updated based on the information received form the representative associated with the second entity as described above.

Notably, the automated telephone calls that are initiated and performed in response to receiving user input detected at the client device 110 via the user input engine 111 can be initiated and performed by an automated assistant that executes locally on the client device 110 or by a cloud-based automated assistant. By staggering initiation and performance of the automated telephone calls in response to requesting the user input, the techniques described herein can conserve computational resources of client devices associated with the entities. For example, by staggering the automated telephone calls to identify a given entity that can satisfy the request, the techniques described herein avoid simultaneously calling each of the entities of the group to identify a given one of the entities that can satisfy the request. Moreover, by continuing performance of active automated telephone calls after another entity has already indicated it can satisfy the request, the techniques described herein avoid wasting computational resources consumed by the active automated telephone calls as compared to simply terminating the active telephone calls.

In implementations where the request is based on received user input detected at the client device 110 via the user input engine 111, and in response to determining that a representative associated with the given entity indicates that the given entity can satisfy the request included in the user input, the request performance engine 154 can cause synthesized speech that includes user data (e.g., stored in user data database) to be rendered at a client device of the representative associated with the given entity. The user data can include name information of the user of the client device 110, address information of the user of the client device 110, contact information of the user of the client device 110 (e.g., telephone number, email address, and/or other contact information), pecuniary information of the user of the client device 110, and/or other information of the user of the client device 110. In some versions of those implementations, the authorization engine 156 can cause a prompt to be rendered on a display of the client device 100 (e.g., using rendering engine 112) to authorize the automated assistant 115 providing the user information to the representative. The prompt can also include a selectable element that, when selected, allows the user of the client device 100 to join the automated telephone call. If the user of the client device 110 authorizes providing of the user data to the representative of the given entity, then the automated assistant can cause synthesized speech audio data that includes the user data to be audibly rendered at the client device of the representative associated with the given entity. However, if the user of the client device 110 does not authorize providing of the user data, then the automated assistant 115 will refrain from causing the synthesized speech audio data that includes the user data to be audibly rendered at the client device of the representative associated with the given entity. In other versions of those implementations, the user of the client device 110 may have previously authorized providing of the user data, and the automated assistant 115 can cause the synthesized speech audio data that includes the user data to be audibly rendered at the client device of the representative associated with the given entity without prompting the user for the authorization.

In some versions of those implementations where the request included in the user input is a request for a status update regarding an item and the representative associated the given entity indicates that the item is available, the automated assistant 115 can request that the representative place the item on hold, at the given entity, for the user of the client device 110, or submit pecuniary information to the representative to acquire the item on behalf of the user of the client device. The request performance engine 154 can determine whether to place the item or hold or acquire the item based on the user input (e.g., "find and reserve disinfectant wipes for me", "find an acquire disinfectant wipes on my behalf", and so on), or prompt the user as to whether the user of the client device 110 would like to place the item on hold or acquire the item (e.g., via rendering engine 112).

For example, assume the request is a request for a status update regarding disinfectant wipes, and further assume that the representative of the given entity indicates that disinfectant wipes are available at the given entity. Further, in response to determining that the item is available at the given entity and in response to determining that the user of the client device 110 wants to acquire the item, the automated assistant 115 can cause synthesized speech audio data to be rendered at a client device of the representative associated with the given entity that includes the user's name, contact information, and pecuniary information (if authorized). As another example, assume the request is a request for availability of a plumbing service for a given time and date, and further assume that the representative of the given entity indicates that the plumbing service is available for the given time and date. Further, in response to determining that the plumbing service is available at the given time and date and in response to determining that the user of the client device 110 wants to reserve the given time and date, the automated assistant 115 can cause synthesized speech audio data to be rendered at a client device of the representative associated with the given entity that includes the user's name, address, and contact information (if authorized).

In implementations where the request is based on received user input detected at the client device 110 via the user input engine 111, the automated assistant 115 can cause the notification engine 113 to generate a notification that includes a result of one or more of the automated telephone calls. The notification generated by the notification engine 113 can be rendered visually via a display of the client device 110 and/or audibly via speaker(s) of the client device 110 (e.g., using the rendering engine 112). The result of the conversation can include, for example, an indication of whether the given entity is able to satisfy the request, an indication whether an item or service has been placed on hold or reserved for the user of the client device 110, an indication of whether an item was acquired for the user of the client device 100, an indication that authorization is needed to submit user data of the user of the client device 110 to acquire the item, an indication that requests the user of the client device 110 to join the automated telephone call with the given entity, and/or other results of the conversation. The notification generated by the notification engine 113 may be a banner notification, a pop-up notification, an email notification, a text message notification, a voice message notification, and/or other types of notifications. Generating the notification(s) based on a result of the conversation is described in greater detail herein (e.g., with respect to FIGS. 5B-5D, 6B, and 6C).

In various implementations, the rendering engine 112 can cause a transcript of the conversation between the automated assistant 115 and the representative of a given entity to be rendered on a display of the client device 110. Moreover, the display may also include one or more selectable elements that, when selected, allows the user of the client device 110 to join the conversation, end an automated telephone call with the given entity, and/or perform other actions. In implementations where the automated assistant 115 is engaged in multiple conversations with multiple entities, a corresponding transcript for each of the conversations can be rendered on the display of the client device 110. In some versions of those implementations, each transcript may be associated with a tab in an automated assistant interface that enables the user of the client device 110 to switch between the transcripts of the multiple conversations since the client device 110 may have limited screen real estate. In other implementations, no transcripts may be displayed and the user of the client device 110 may simply receive the notification(s) described above.

In implementations where the request is based on analyzing query activity via the query analysis engine 151, the request performance engine 154 can cause the automated assistant 115 to initiate a corresponding automated telephone call with a given entity, of the entities, of the group to perform the action included in the request. In some implementations, the request performance engine 154 can cause multiple instances of the automated assistant 115 described herein to simultaneously initiate and perform a plurality of corresponding automated telephone calls with a corresponding one of the entities of the group. For example, a first instance of the automated assistant 115 can initiate and perform a first automated telephone call with a first entity of the group, a second instance of the automated assistant 115 can simultaneously initiate and perform a second automated telephone call with second entity of the group, and so on for each of the entities of the group. Put another way, instances of the automated assistant 115 can initiate and perform each of the automated telephone calls in parallel. In other implementations, the corresponding automated telephone calls can be initiated and performed in batches (e.g., with a subset of the group of the entities) or sequentially. Notably, each of the instances of the automated assistant 115 may be executed remotely at server(s) (e.g., cloud-based automated assistant) along with the automated request system 180, and the client device 110 may be omitted.

Each of the instances of the automated assistant can engage in a corresponding conversation with a corresponding one of the entities to perform the action included in the request. The temporal delay engine 157 can determine a temporal delay before initiating performance of a subsequent corresponding automated telephone call with the corresponding entity based on information received during each of the corresponding conversations. Further, the temporal delay engine 157 can assign various periods of time as the temporal delay based on information received during the corresponding automated telephone call, hours of operation associated with the corresponding entity, laws restricting whether and/or when automated telephone may be performed, computational and/or network bandwidth considerations (e.g., "slow" time periods for telephone calls, such as early in the morning). Moreover, the temporal delay engine 157 can store the time periods assigned as the temporal delay in association with the corresponding entity in the temporal delay(s) database 157A. In implementations where the request is for a status update regarding an item, the period of time assigned to the temporal delay can be based on an indication of an available quantity of the item. For instance, a first period of time can be assigned as the temporal delay if the available quantity of the item falls within a first quantity range, a second period of time can be assigned as the temporal delay if the available quantity of the item falls within a second quantity range, and so on for various quantity ranges of the item. As another instance, a first period of time can be assigned as the temporal delay if the available quantity of the item satisfies a threshold quantity, whereas a second period of time can be assigned as the temporal delay if the available quantity of the item fails to satisfy the threshold quantity.

For example, assume the request is a request for a status update regarding toilet paper, and further assume a representative associated with a given entity indicates toilet paper is available at the given entity. Moreover, assume the representative associated with the given entity indicates that there is a sufficient quantity of toilet paper to last the remaining part of the day. In this example, the temporal delay engine 157 can assign a first time period to the temporal delay associated with the given entity such that the automated assistant 115 will not initiate a subsequent corresponding automated telephone call with the given entity until at least the following day. In contrast, assume the representative associated with the given entity indicates that there is the quantity of toilet paper will not last until the end of the day. In this example, the temporal delay engine 157 can assign a second time period to the temporal delay associated with the given entity such that the automated assistant 115 will initiate a subsequent corresponding automated telephone call with the given entity later that same day. Notably, these temporal delays will lapse at different times based on the information received during the automated telephone call. Moreover, search result(s) associated with the given entity can be updated based on the information received during the automated telephone call(s) as described above with respect to the update engine 155. In these and other manners, a corresponding temporal delay can be dynamically determined for each entity based on information received during automated telephone call(s) with the entity. Dynamically determining the temporal delay in such manners can balance the technical benefits achieved with maintaining up-to-date information from the entity with the resources utilized in performing automated telephone calls. Put another way, dynamically determining the temporal delay can prevent another automated phone call to the entity from being performed too quickly, which leads to unnecessary utilization of computational and/or network resources—while ensuring that information from the entity is up-to-date.

By using the techniques described herein, various technical advantages can be achieved. As one non-limiting example, the automated assistant 115 can successfully perform the automated telephone calls to satisfy the request in a quicker and more efficient manner since the automated telephone calls can be intelligently initiated using the automated request system 180. By intelligently initiating the automated telephone calls, both network and computational resources can be conserved since a length of the conversation and number of the conversations can be reduced by using the techniques disclosed herein. As another non-limiting example, the search result(s) associated with the entities can be updated based on information received during the conversations. By updating the search result(s) associated with the entities, the entities receive fewer telephone calls from a plurality of other users since each the other users need not individually initiate telephone calls with each of the entities to request status updates regarding various items and/or inquire about availability of various services. Moreover, although FIG. 1 is described herein with respect to requesting status updates regarding a single item or service, it should be understood that is for the sake of example and is not meant to be limiting. For example, the automated assistant 115 can request status updates regarding a plurality of items during a corresponding automated telephone call with a given one of the entities of the group.

Figure 2:
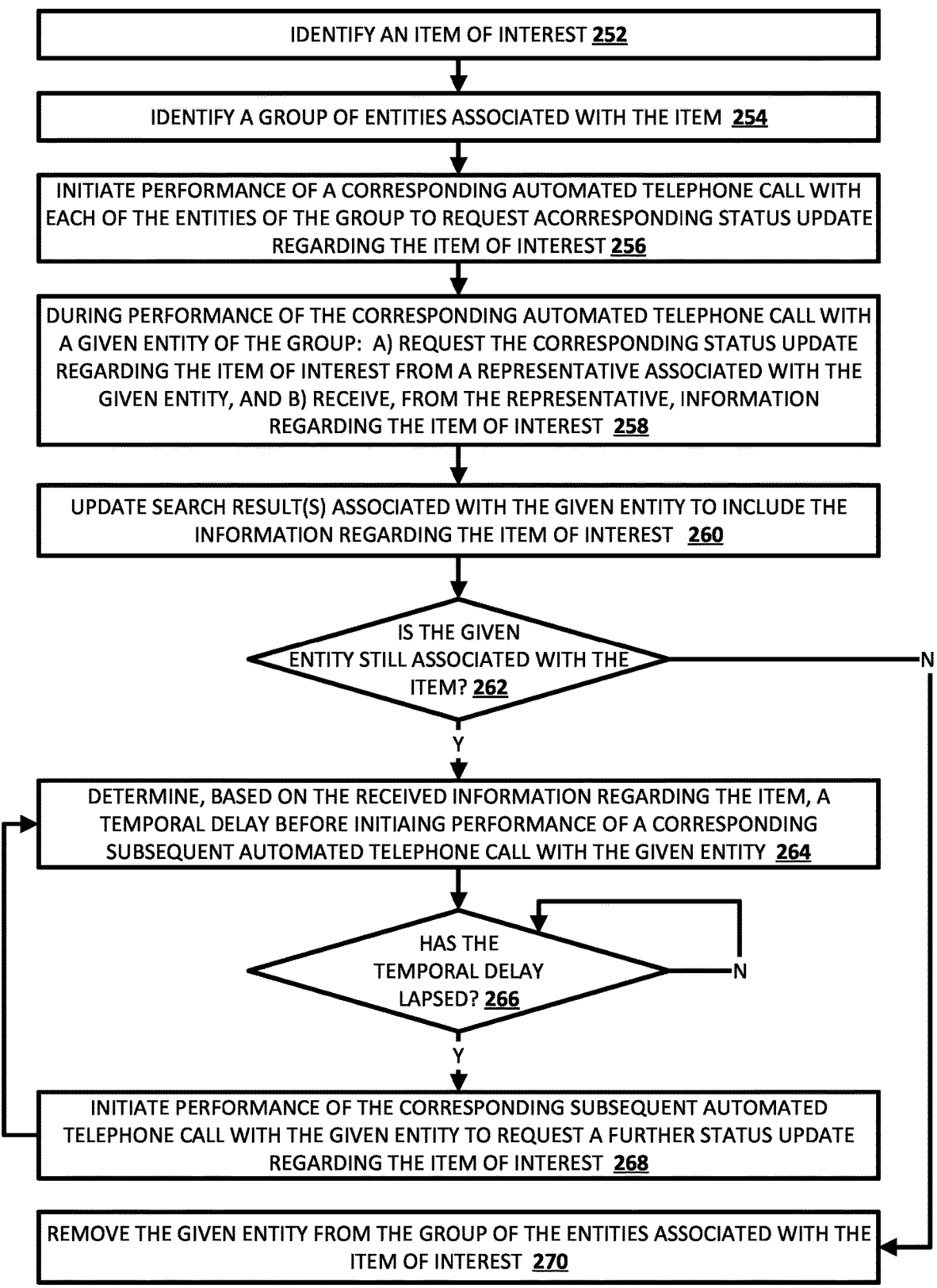
FIG. 2 depicts a flowchart illustrating example method of determining a temporal delay for a subsequent automated telephone call with a given entity based on a status update regarding an item of interest received during an automated telephone call with the given entity, in accordance with various implementations.

FIG. 2 depicts a flowchart illustrating an example method 200 of determining a temporal delay for a subsequent automated telephone call with a given entity based on a status update regarding an item of interest received during an automated telephone call with the given entity. For convenience, the operations of method 300 are described with reference to a system that performs the operations. This system of method 300 includes one or more processors and/or other component(s) of a computing device, such as client device 110 of FIG. 1, computing device 410A, 410B of FIGS. 4A-4D, computing device 510 of FIGS. 5A-5D, computing device 610 of FIGS. 6A-6C, computing device 710 of FIG. 7, one or more remote servers, and/or other computing devices. Moreover, while operations of method 300 are shown in a particular order, this is not meant to be limiting. One or more operations may be reordered, omitted, or added.

At block 252, the system identifies an item of interest. In some implementations, the item of interest can be identified based on analyzing query activity of a plurality of users to identify a surge of submitted queries as described in more detail above (e.g., with respect to the query analysis engine 151 of FIG. 1). In some versions of those implementations, the surge of the submitted queries may originate from a particular geographic region. In other implementations, the item of interest can be identified based on user input from a user that causes the system to perform the method 200. At block 254, the system identifies a group of entities associated with the item of interest. The entities of the group may be stored in association with the item of interest in one or more databases (e.g., the entity identification engine 153 and the entities database 153A of FIG. 1). The system can retrieve the entities from one or more of the databases. In implementations where the surge of the submitted queries may be from the particular geographic region, the entities in the group may be restricted to those located in the particular geographic region.

At block 256, the system initiates performance of a corresponding automated telephone call with each of the entities of the group to request a corresponding status update regarding the item of interest. The system can initiate the automated telephone call by placing the automated telephone call and rendering one or more corresponding instances of synthesized speech that request the corresponding status update regarding the item of interest. In some implementations, the system can simultaneously initiate performance of a plurality of corresponding automated telephone calls with each of the entities of the group using corresponding instances of an automated assistant (e.g., automated assistant 115). In other implementations, the system may only initiate performance with a subset of the entities, such that automated telephone calls with each of the entities are initiated in batches until the automated telephone calls with each of the entities of the group have been performed. In various implementations, the instances of the automated assistant can be instances of a cloud-based assistant.

At block 258, during performance of the corresponding automated telephone call with a given entity, of the entities, of the group, the system: A) requests the corresponding status update regarding the item of interest from a representative associated with the given entity, and B) receives, from the representative, information regarding the item of interest. The system can perform the corresponding automated telephone call by engaging in a conversation with the representative associated with the given entity. Further, the system can request the corresponding status update by rendering one or more of the corresponding instances of synthesized speech during each of the automated telephone calls. For example, the system can cause synthesized speech (e.g., "hello, do you sell toilet paper?", "Do you have any toilet paper available?", "How much toilet paper do you have available?") to be rendered at a computing device of the representative associated with the given entity. Further, the system can process audio data corresponding to the information received during the corresponding automated telephone call using speech recognition model(s) (e.g., as described in greater detail with respect to the speech recognition model(s) of FIG. 1). The information received from the representative may be responsive to the rendering of the synthesized speech. As described in greater detail above with respect to FIG. 1, the system can intelligently respond to the representative during the conversation.

At block 260, the system updates search result(s) associated with the given entity to include the information regarding the item of interest. The search result(s) can be updated for each of the entities in the group in response to receiving corresponding information from each of the entities. In some implementations, the updated search result(s) may also include a temporal indicator of when the corresponding automated telephone call was performed and the information was received. For example, assume the received information indicates that Example Store 1 has toilet paper available. The search result(s) associated with Example Store 1 can be updated to indicate toilet paper is available at Example Store 1 along with a time and date that the information was received.

At block 262, the system determines whether the given entity is still associated with the item of interest. The system can determine whether the given entity is still associated with the item of interest based on processing the received information regarding the item of interest from block 258. If, at an iteration of block 262, the system determines the given entity is still associated with the item of interest, the system proceeds to block 264. For example, assume the system causes synthesized speech of "do you sell toilet paper?" to be rendered at a computing device associated with the representative to verify the given entity is still associated with the item of interest. Further assume that received information indicates that Example Store 1 sells toilet paper.

In this example, the system has verified that the given entity is still associated with the item of interest.

At block 264, the system determines, based on the received information regarding the item, a temporal delay before initiating performance of a corresponding subsequent automated telephone call with the given entity. Further, the system can assign the determined temporal delay to the given entity in one or more databases. The determined temporal delay can be a time period that is assigned to the given entity based on an available quantity of the item of interest. For example, assume a representative associated with Example Store 1 indicates that there is a sufficient quantity of toilet paper for three days. In this example, the system may assign a time period of three days as the temporal delay based on the received information indicating that there is sufficient quantity of toilet paper for three days at Example Store 1. In contrast, assume the representative associated with Example Store 1 anticipates that there is only a sufficient quantity of toilet paper for the morning. In this example, the system may assign a time period of five hours as the temporal delay based on the received information indicating that there is sufficient quantity of toilet paper for three days at Example Store 1

At block 266, the system determines whether the temporal delay, assigned to the given entity, determined at block 264 has lapsed. If, at an iteration of block 266, the system determines that the temporal delay has not lapsed, then the system continues monitoring for the lapse of the temporal delay, assigned to the given entity, at block 266. Notably, although the corresponding automated telephones may initially be performed in parallel, the corresponding subsequent automated telephone calls are initiated based on the lapse of the determined temporal delays. However, if at an iteration of block 266, the system determines the temporal delay determined at block 264 has lapsed, then the system proceeds to block 268.

At block 268, the system initiates performance of the corresponding subsequent automated telephone call with the given entity to request a further status update regarding the item of interest. The system can request the further status update regarding the item of interest in a similar manner described above with respect to block 258. Further, the system can return to block 264 to determine a further temporal delay based on information received during the corresponding subsequent automated telephone call. The system can continue determining temporal delays for corresponding further automated telephone calls until one or more conditions are satisfied. The one or more conditions can include, for example, a drop in the surge of the submitted queries for the item of interest, a threshold duration of time (e.g., one week, two weeks, one month, etc.), and/or other conditions are satisfied.

However, if at an iteration of block 262, the system determines that the entity is no longer associated with the item of interest, then the system may refrain from determining the temporal delay and proceed to block 270 to remove the given entity from the group of the entities associated with the item of interest. As a result, the system will not initiate a subsequent automated telephone call with the given entity to request any further status update regarding the item of interest. However, the system may still subsequently call the given entity to request status updates regarding other items of interest.

Although the temporal delay described in FIG. 2 is described with respect to a single entity, it should be understood that this is for the sake of example and is not meant to be limiting. As noted above, the automated assistant can simultaneously initiate performance of a plurality of automated telephone calls with the entities of the group. During each of the automated telephone calls, a temporal delay can be assigned to a corresponding one of the entities, and the temporal delay for each of the entities may differ based on the received information regarding the item of interest from the representative associated with the corresponding one of the entities.

Figure 3:
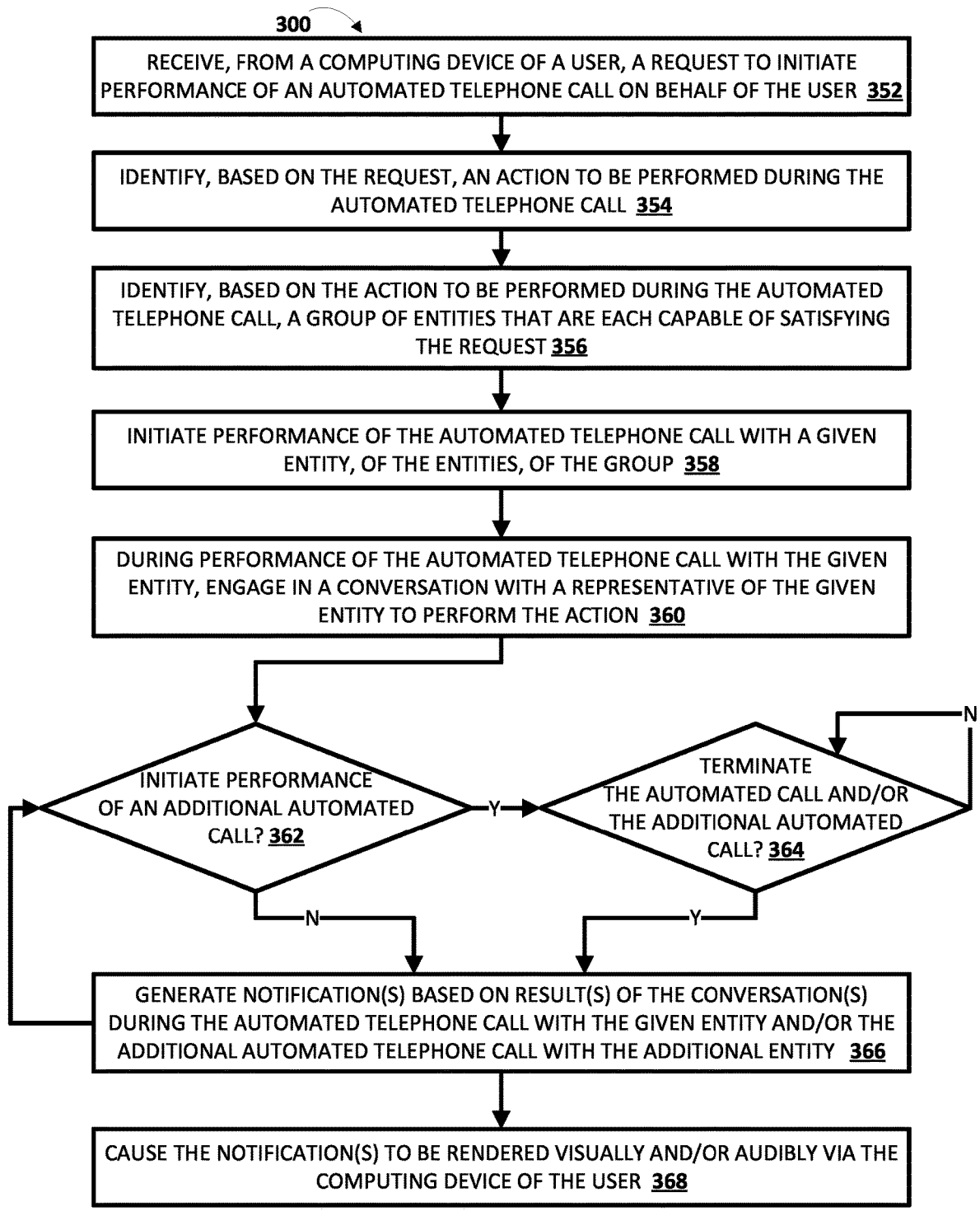
FIG. 3 depicts a flowchart illustrating example method of determining whether to initiate an additional automated telephone call with an additional entity based on information received during an automated telephone call with a given entity, in accordance with various implementations.

FIG. 3 depicts a flowchart illustrating example method 300 of determining whether to initiate an additional automated telephone call with an additional entity based on information received during an automated telephone call with a given entity. For convenience, the operations of method 300 are described with reference to a system that performs the operations. This system of method 300 includes one or more processors and/or other component(s) of a computing device, such as client device 110 of FIG. 1, computing device 410A, 410B of FIGS. 4A-4D, computing device 510 of FIGS. 5A-5D, computing device 610 of FIGS. 6A-6C, computing device 710 of FIG. 7, one or more remote servers, and/or other computing devices. Moreover, while operations of method 300 are shown in a particular order, this is not meant to be limiting. One or more operations may be reordered, omitted, or added.

At block 352, the system receives, from a computing device of a user, a request to initiate performance of an automated telephone call on behalf of the user. The request can be based on user input received at the computing device of the user. In some implementations, the user input can be touch or typed input from a search interface or an automated assistant interface displayed on the computing device of the user. For example, the user input can touch input directed to a selectable element of a search interface that, when selected, causes the system to initiate automated telephone calls to perform the request. In other implementations, the user input can be spoken input detected via microphone(s) of the computing device of the user. The spoken input can be processed, using speech recognition model(s) and/or NLU model(s), to determine the user input includes the request (e.g., as described above with respect to FIG. 1).

At block 354, the system identifies, based on the request, an action to be performed during the automated telephone call. The action can be identified based on one or more terms included in the user input. The action can include, for example, requesting a status update regarding an item of interest from a given entity or multiple entities, reserving an item of interest at a location associated with a given entity, acquiring an item of interest at a location with a given entity, requesting availability of a service from a given entity or multiple entities, and/or other actions that can be performed using the automated telephone calls described herein. For example, the action can include an action to acquire toilet paper at a particular entity, or to generally acquire toilet paper without specifying any particular entity. As another example, the action can include an action to find the cheapest electrician that is available during a given time period. Identifying the action to be performed is described in greater detail above (e.g., with respect to the request handling engine 152 of FIG. 1)

At block 356, the system identifies, based on the action to be performed during the automated call, a group of entities that are each capable of satisfying the request. The entities of the group may be stored in association with the item or service, that is included in the request, in one or more databases (e.g., the entity identification engine 153 and the entities database 153A of FIG. 1). The system can retrieve the entities from one or more of the databases. Moreover, the entities in the group may be restricted to entities located within a threshold distance of a current location of the computing device of the user. For example, assume the action included in the request is a request for a status update regarding an item, the system may include only entities within a five mile radius that are associated with the item in the group of the entities.

At block 358, the system initiates performance of the automated telephone call with a given entity, of the entities, of the group. The system can initiate the automated telephone call by placing the automated telephone call and rendering one or more corresponding instances of synthesized speech that request the corresponding status update regarding the item of interest. In some implementations, the system can initiate performance of the automated telephone call using an automated assistant that operates locally on the computing device of the user that provided the request. In other implementations, the system can initiate performance of the automated telephone call using an automated assistant that operates remotely at server(s) (e.g., a cloud-based automated assistant). In yet other implementations, the system can initiate performance of the automated telephone call using an automated assistant that operates in part on the computing device of the user and in part on server(s) (e.g., the automated assistant 115 as depicted in FIG. 1).

At block 360, during performance of the automated telephone call with the given entity, the system engages in a conversation with a representative of the given entity to perform the action. During the conversation, the system can perform the action, and receive, from the representative, information regarding the action (e.g., information regarding availability of an item or service and/or other information described herein). The system can perform the action by rendering one or more of the corresponding instances of synthesized speech during each of the automated telephone calls. For example, the system can cause synthesized speech (e.g., "hello, do you sell toilet paper?", "Do you have any toilet paper available?", "How much toilet paper do you have available?") to be rendered at an additional computing device of the representative associated with the given entity. Further, the system can process audio data corresponding to the information received during the corresponding automated telephone call using speech recognition model(s) (e.g., as described in greater detail with respect to the speech recognition model(s) of FIG. 1). The information received from the representative may be responsive to the rendering of the synthesized speech. As described in greater detail above with respect to FIG. 1, the system can intelligently respond to the representative during the conversation.

At block 362, the system determines whether to initiate performance of an additional automate call with an additional entity, of the entities, of the group. The system can determine to initiate performance of the additional automated call with the additional entity based on a call initiation time associated with the additional entity. The call initiation time can be specific to the additional entity. In some implementations, the call initiation time can be determined based on historical call data stored in association with the entity and/or the additional entity (e.g., the historical call data database 154A of FIG. 1). For example, the call initiation time for the additional entity can be determined based on whether the entity and/or additional entity is associated with an IVR system, an average duration of prior automated telephone calls with the entity and/or the additional entity, an average hold time associated with the entity and/or the additional entity, and/or any other call data that can be gleaned from the previous automated telephone calls with the entity and/or the additional entity. For example, if the determined call initiation time is 30 seconds after initiation of the automated telephone call with the given entity, it may be based on determining that both the given entity and the additional entity are associated with hold times of 30 seconds. In these examples, the automated telephone calls are staggered, such that the automated assistant can engage with a representative associated with each of the entities 30 seconds apart, rather than both representatives at the same time. In some additional and/or alternative implementations, the call initiation time can be determined based on a result of the automated telephone call with the entity. Continuing with the above example, if the system is only on hold for 20 seconds, rather than the expected 30 seconds, the call initiation time can change from 30 seconds to 20 seconds, such that a similar staggering of the automated telephone calls is achieved. If, at an iteration of block 362, the system determines not to initiate performance of the additional automated call, then the system proceeds to block 366. Notably, this indicates that the request can be handled by the given entity, and that the given entity indicates it can handle the request prior to the call initiation time. For instance, this indicates the given entity quickly indicated that it can satisfy the request. However, if at an iteration of block 362, the system determines to initiate performance of an additional automated call with the additional entity, then the system may proceed to block 364. As described above with respect to block 358, the system can initiate the additional automated telephone call using an automated assistant local to the computing device of the user, remote at server(s), and/or a combination thereof.

At block 364, the system determines whether to proactively terminate the automated telephone call with the given entity and/or the additional automated telephone call with the additional entity. The system can determine whether to proactively terminate the automated telephone call and/or the additional automated telephone call based on the information received during each of the automated telephone calls. For example, if either the entity or the additional entity indicates that the item or service is not available, then the corresponding automated telephone call may be proactively terminated. In implementations where the given entity indicates that it can satisfy the request and an additional representative associated with the additional entity is already engaged in a conversation with the automated assistant, then the system may not proactively terminate the additional automated telephone call. In some versions of those implementations, the system can still perform the action, and search result(s) associated with the additional entity can be updated based on performance of the action. In this manner, computational resources of an additional computing device of the representative associated with the additional entity are not wasted by terminating the additional automated telephone call without learning any information related to the original request. If, at an iteration of block 364, the system does not determine to proactively terminate the automated call with the given entity and/or the additional automated call with the additional entity, then the system can monitor at block 364 for one or more signals to proactively terminate the automated call with the given entity and/or the additional automated call with the additional entity. However, if at an iteration at block 364, the system determines to proactively terminate the automated call with the given entity and/or the additional automated call with the additional entity, then the system proceeds to block 366.

At block 366, the system generates notification(s) based on the result(s) of the conversation(s) during the automated call with the given entity and/or the additional automated call with the additional entity. The notification(s) can be generated for each of the automated telephone calls initiated by the system. Further, the notification(s) can include, for example, an indication of availability regarding an item or service, whether the system reserved the item or service on behalf of the user, whether the system acquired the item on behalf of the user, and/or other results of the conversation. In some implementations, the notification(s) may include prompt(s) for the user. The prompt(s) can include, for example, a prompt for the user join the automated telephone call, a prompt for the user to authorize that the system can provide name information, address information, contact information, pecuniary information, and/or other user data of the user of the computing device. At block 368, the system causes the notification(s) to be rendered visually and/or audibly via the computing device of the user. The notification(s) can be rendered visually via a display of the computing device or another computing device associated with the user and/or audibly via speaker(s) of the computing device or the another computing device associated with the user. Generating and rendering the notification(s) is described in greater detail herein (e.g., with respect to FIGS. 1, 5B-5D, 6B, and 6C).

Although the method 300 is described herein as with respect to the given entity and the additional entities, it should be understood that is for the sake of example and is not meant to be limiting. It should be understood that call initiation times for each of the other entities of the group can be determined, and each of the other entities of the group can be called until the request is satisfied. If the request cannot be satisfied by any of the entities of the group, then an additional group of entities can be identified as described above (e.g., with respect to the entity identification engine 153 of FIG. 1).

Figure 4A:
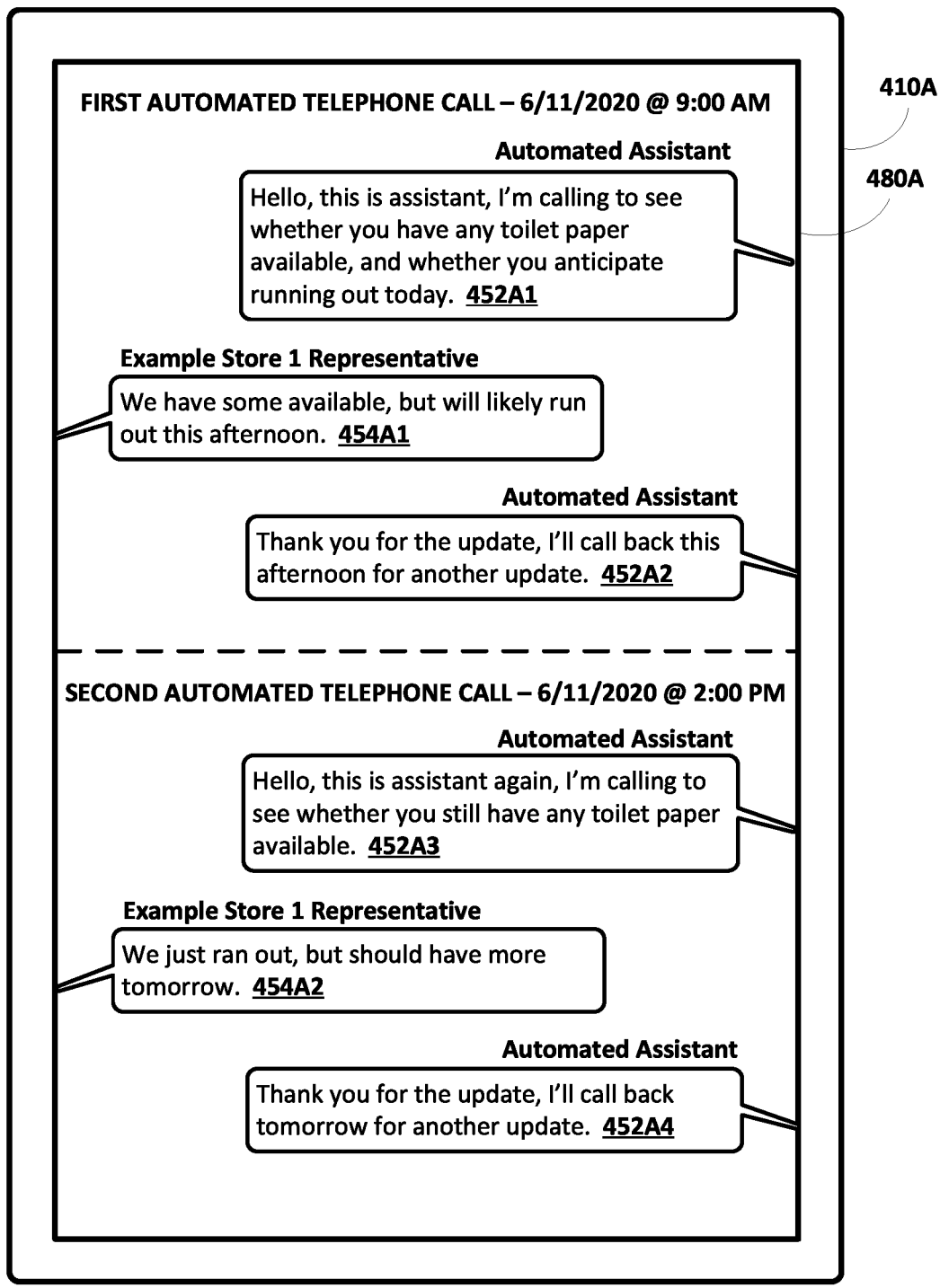
FIG. 4A, FIG. 4B, FIG. 4C, and FIG. 4D depict non-limiting examples of determining temporal delays for subsequent automated telephone calls with various entities and updating results associated with each of the various entities based on results of automated telephone calls, in accordance with various implementations.
Figure 4B:
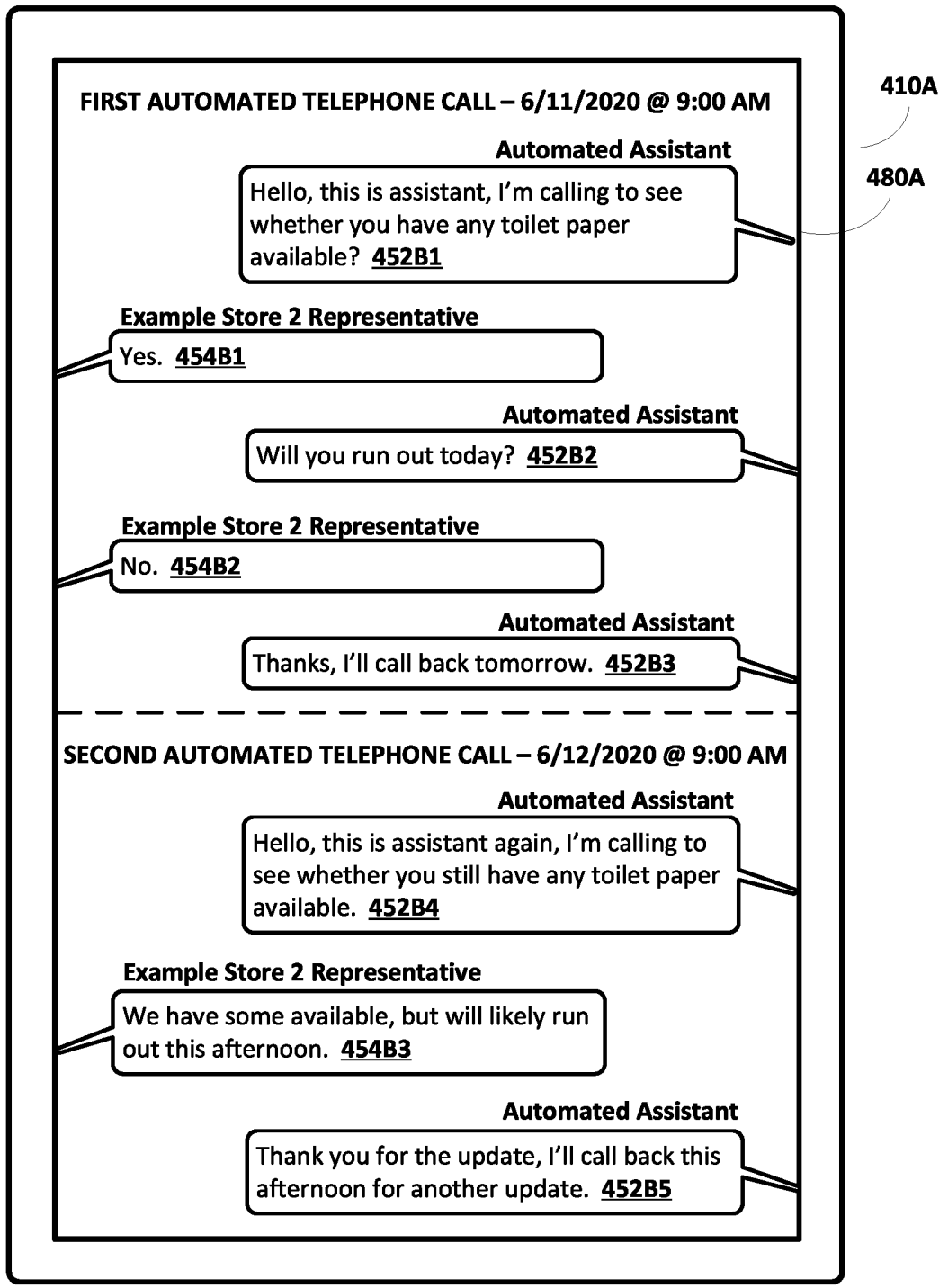
Figure 4C:
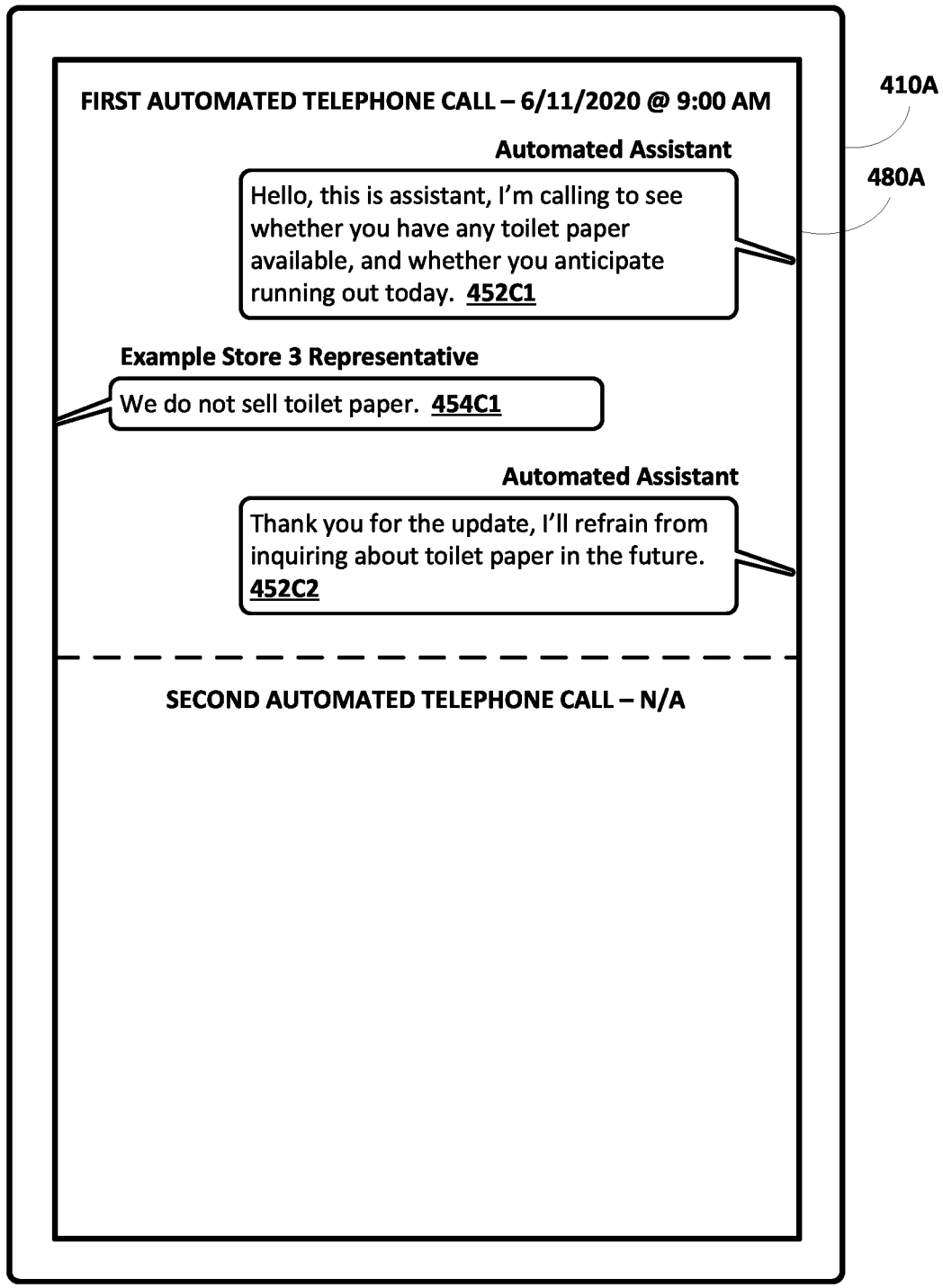

Referring now to FIGS. 4A-4C, non-limiting examples of determining temporal delays for subsequent automated telephone calls with various entities are depicted. Notably, transcripts of the automated telephone calls of FIGS. 4A-4C are depicted on a graphical user interface 480A of a computing device 410A. It should be understood that is for the sake of example to illustrate the techniques described herein and is not meant to be limiting. For instance, the automated telephone calls described herein can be initiated and performed by an automated assistant for the sake of brevity (e.g., using the automated request system 180 of FIG. 1). The automated assistant can be a cloud-based automated assistant executing remotely at server(s) and/or other computing device(s).

In some implementations, and as described in more detail above (e.g., with respect to the query analysis engine 151 and the request handling engine 152 of FIG. 1), the automated assistant can identify a request for a status update regarding an item of interest or service based on analyzing query activity of a plurality of users (e.g., stored in the query activity database 151A of FIG. 1). The automated telephone calls can be initiated and performed by the automated assistant in response to identifying the request for the status update regarding the item of interest or service. The automated assistant can identify the request based on, for example, determining whether a threshold number of queries for a given item or service have been submitted by the plurality of users. In some versions of those implementations, the one or more conditions can include determining whether the threshold number of queries for a given item or service have been submitted by the plurality of users within a given time frame as described above with respect to FIG. 1. In some versions of those implementations, the query activity may be restricted to queries submitted by users in a particular geographic region.

In some implementations, the automated assistant can further identify a group of entities that are associated with the identified request as described in greater detail herein (e.g., with respect to the entity identification engine 153 of FIG. 1). The group of entities can be stored in association with the item or service included in the request (e.g., in the entities database 153A), along with other data related to each of the entities (e.g., physical location(s), webpage(s), and/or other data). A corresponding one of the automated telephone calls can be initiated and performed, by the automated assistant, with a given one of the entities of the group, such that the automated assistant can initiate and perform the corresponding automated telephone call with each individual one of entities of the group. In implementations where the submitted queries originate from the particular geographic region, the entities included in the group can also be restricted to entities that are located within the particular geographic region. The automated assistant can begin initiating and performing the automated telephone calls in response to identifying the item or service based on analyzing the query activity and in response to identifying the group of the entities associated with the item or service included in the request. Further, the automated assistant can perform a corresponding one of the automated telephone calls by rendering instances of synthesized speech at a computing device of a corresponding representative associated with a corresponding one of the entities. Moreover, the automated assistant can process audio data corresponding to information received from the corresponding representative during the corresponding automated telephone call. In this manner, the automated assistant can engage in a conversation with the representative, and subsequent synthesized speech can be based on the information received from the corresponding representative.

For example, with respect to FIGS. 4A-4C, assume the automated assistant identifies 15,000 submitted queries across a six hour period of time that include the terms "toilet paper", and that originate from a geographic region of Jefferson County, Ky. In this example, the automated assistant may determine that the 15,000 submitted queries across the six hour period satisfies one or more conditions to initiate a plurality of corresponding automated telephone calls with a group of entities located in Jefferson County, Ky. to request a corresponding status update regarding availability of toilet paper. Accordingly, the automated assistant can access one or more databases (e.g., the entities database 153A of FIG. 1) to identify a plurality of entities located in Jefferson County, Ky. that are stored in association with a toilet paper item, and can include the identified entities in the group of entities. As shown in FIGS. 4A-4C, the group of the entities includes at least Example Store 1, Example Store 2, and Example Store 3.

More particularly, the automated assistant can initiate a first automated telephone call with Example Store 1 to request the status update regarding toilet paper at Example Store 1 as shown in FIG. 4A, a first automated telephone call with Example Store 2 to request the status update regarding toilet paper at Example Store 2 as shown in FIG. 4B, and a first automated telephone call with Example Store 3 to request the status update regarding toilet paper at Example Store 3 as shown in FIG. 4C. Notably, each of the first automated telephone calls with each of the entities in FIGS. 4A-4C can be initiated and performed in parallel (e.g., as indicated by being initiated on Jun. 11, 2020 at 9:00 AM).

Further, each of the first automated telephone calls can be initiated and performed using a corresponding instance of the automated assistant.

As noted above, the automated assistant can perform each of the corresponding automated telephone calls by causing instances of synthesized speech to be rendered at the computing device of the representative associated with a given one of the entities. In particular, the synthesized speech can include the request for the status update regarding the toilet paper, and optionally other information. For example, as shown in FIG. 4A, the automated assistant can cause synthesized speech 452A1 that includes the request for the status update regarding the toilet paper at Example Store 1 (e.g., "I'm calling to see whether you have any toilet paper available") and also that includes a request for an available quantity of toilet paper at Example Store 1 (e.g., "whether you anticipate running out today") to be rendered at a computing device of Example Store 1 Representative. Further, the automated assistant can process audio data corresponding to information 454A1 that is received responsive to the synthesized speech (e.g., "We have some available, but will likely run out this afternoon") to determine whether toilet paper is available at Example Store 1 and an indication of the available quantity. As another example, as shown in FIG. 4B, the automated assistant can cause synthesized speech 452B1 that includes the request for the status update regarding the toilet paper at Example Store 2 (e.g., "I'm calling to see whether you have any toilet paper available") to be rendered at a computing device of Example Store 2 Representative, but withhold a request for an available quantity of toilet paper at Example Store 2 until the Example Store 2 Representative confirms that Example Store 2 has toilet paper available based on processing audio data corresponding to received information 454B1 (e.g., "Yes") from the Example Store 2 Representative. In response to verifying that Example Store 2 has toilet paper available, the automated assistant may then request the status update for the available quantity of toilet paper at Example Store 2 in further synthesized speech 452B2 (e.g., "Will you run out today"), and can determine an indication of the available quantity of toilet paper at Example Store 2 based on processing further received information 454B2 (e.g., "No" indicating that Example Store 2 will not run out of toilet paper today). Further, the automated assistant can process audio data corresponding to information 454A1 that is received responsive to the synthesized speech (e.g., "We have some available, but will likely run out this afternoon"). As yet another example, as shown in FIG. 4C, the automated assistant can cause synthesized speech 452C1 that includes the request for the status update regarding the toilet paper at Example Store 3 (e.g., "I'm calling to see whether you have any toilet paper available") and also that includes a request for an available quantity of toilet paper at Example Store 3 (e.g., "whether you anticipate running out today") to be rendered at a computing device of Example Store 3 Representative. Further, the automated assistant can process audio data corresponding to information 454C1 that is received responsive to the synthesized speech (e.g., "We do not sell toilet paper") to determine that Example Store 3 should not be stored in associated with toilet paper. In this example, Example Store 3 can be removed from the group of entities based on the received information 454C1.

For each of the corresponding automated telephone calls in FIGS. 4A-4C, the automated assistant can assign a period of time to each of the entities of the group as a temporal delay. When the temporal delay lapses, for a corresponding one of the entities of the group, the automated assistant can initiate and perform a subsequent corresponding automated telephone call with the corresponding entity to request a corresponding further status update regarding the item. The period of time assigned as the temporal delay can be determined based on the information received from the representative associated with the given entity (e.g., as described in greater detail above with respect to the temporal delay engine 157). In some implementations, the automated assistant can provide an indication of the time period assigned to the temporal delay for the corresponding entity during each of the first automated telephone calls.

For example, as shown in FIG. 4A, the automated assistant can cause further synthesized speech 452A2 to be rendered at the computing device of Example Store 1 Representative that is indicative of the time period assigned as the temporal delay for Example Store 1 (e.g., "I'll call back this afternoon for another update"). In this example, the time period may only be several hours (e.g., five hours as shown in FIG. 4A) since the information 454A1 indicated that Example Store 1 will "likely run out [of toilet paper] this afternoon". Accordingly, when the temporal delay lapses (e.g., five hours after the first automated telephone call with Example Store 1 (e.g., at 2:00 PM the same day)), the automated assistant can initiate and perform a second automated telephone call to request the corresponding further status update regarding toilet paper by causing yet further synthesized speech 452A3 to be rendered at the computing device of the Example Store 1 Representative, processing audio data corresponding to further information 454A2 received from Example Store 1 Representative response to the yet further synthesized speech 452A3, and causing even further synthesized speech 452A4 to be rendered at the computing device of the Example Store 1 Representative that includes an indication of a further temporal delay determined based on the further information 452A2 received during the second automated telephone call with the Example Store 1 Representative. For instance, if Example Store 1 Representative indicates in the further information 452A2 that Example Store 1 will not have toilet paper until a shipment arrives in three days, then the time period assigned as the further temporal delay can be 72 hours to avoid calling Example Store 1 over the next three days since they already indicated they will not have toilet paper until the next shipment arrives.

As another example, as shown in FIG. 4B, the automated assistant can cause yet further synthesized speech 452B3 to be rendered at the computing device of Example Store 2 Representative that is indicative of the time period assigned as the temporal delay for Example Store 2 (e.g., "I'll call back tomorrow"). In this example, the time period may be a 24 hour period since the information 454B2 indicated that Example Store 2 will not run out of toilet paper that day. Accordingly, when the temporal delay lapses (e.g., 24 hours after the first automated telephone call with Example Store 2 (e.g., at 9:00 AM the following day)), the automated assistant can initiate and perform a second automated telephone call to request the corresponding further status update regarding toilet paper by causing even further synthesized speech 452B4 to be rendered at the computing device of the Example Store 2 Representative, processing audio data corresponding to yet further information 454B3 received from Example Store 2 Representative response to the even further synthesized speech 452B4, and causing yet even further synthesized speech 452A5 to be rendered at the computing device of Example Store 2 Representative that includes an indication of a further temporal delay determined based on the yet further information 452B3 received during the second automated telephone call with the Example Store 2 Representative. Thus, as illustrated by the temporal delays in FIGS. 4A and 4B, the automated assistant can determine dynamic time periods to assign to the temporal delays based on information received during the automated telephone calls.

Notably, as shown in FIG. 4C, the automated assistant can cause further synthesized speech 452C2 to be rendered at the computing device of Example Store 3 Representative that indicates the automated assistant will refrain from inquiring about toilet paper in the future from Example Store 3. In this example, the automated assistant may also refrain from determining a time period to assign as a temporal delay to Example Store 3 since it has been removed from the group of entities associated with the item based on the received information 454C1 as described above. Accordingly, no second automated telephone call with Example Store 3 is initiated or performed.

Figure 4D:
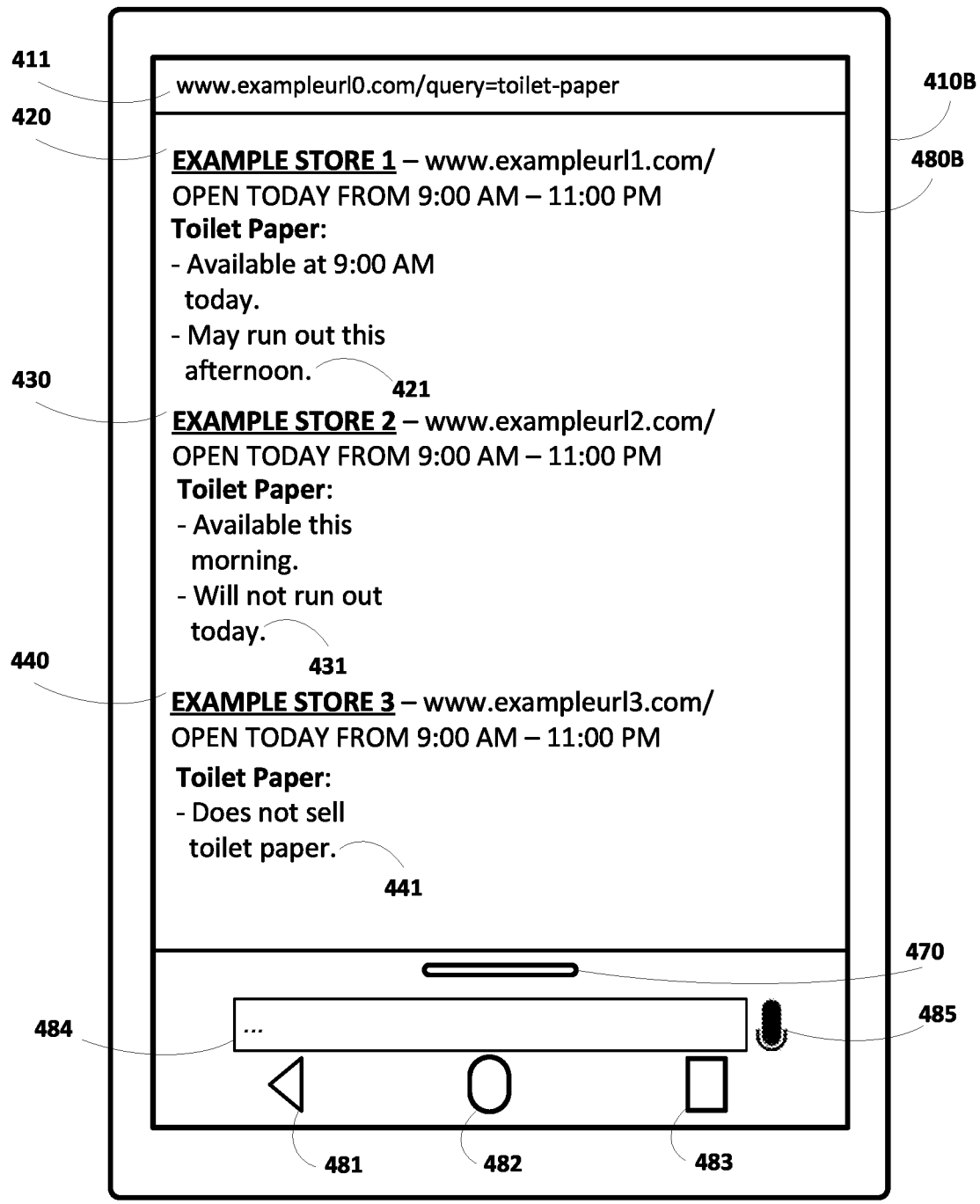

In various implementations, search result(s) associated with the entities of the group can be updated to include the information received during the corresponding automated telephone calls. In some versions of those implementations, the search result(s) can also be updated to include a temporal indicator of when the status update was requested. For example, FIG. 4D illustrates, on a graphical user interface 480B of a computing device 410B of a user, updated search results associated with each of the various entities based on results of automated telephone calls from FIGS. 4A-4C. The graphical user interface 480B of FIG. 4D further includes a textual reply interface element 484 that the user may select to generate user input via a virtual keyboard or other touch and/or typed input, and a voice reply interface element 485 that the user may select to generate user input via microphone(s) of the client device 410. In some implementations, the user may generate user input via the microphone(s) without selection of the voice reply interface element 485. For example, active monitoring for audible user input via the microphone(s) may occur to obviate the need for the user to select the voice reply interface element 485. In some of those and/or in other implementations, the voice reply interface element 485 may be omitted. Moreover, in some implementations, the textual reply interface element 484 may additionally and/or alternatively be omitted (e.g., the user may only provide audible user input). The graphical user interface 480 of FIGS. 4A-4D also includes system interface elements 481, 482, 483 that may be interacted with by the user to cause the computing device 410 to perform one or more actions.

With respect to FIG. 4D, assume the user of the computing device 410B is also located in Jefferson County, Ky., and further assume the user of the computing device 410 has submitted a search query (e.g., spoken or typed via an automated assistant interface or search interface) that includes the terms "toilet paper" (e.g., as indicated by URL 411) after the first automated telephone calls in FIGS. 4A-4C, but prior to the second automated telephone calls. Further assume that a first search result 420 associated with Example Store 1, a second search result 430 associated with Example Store 2, and a third search result 440 associated with Example Store 3 are each responsive to the search query. In this example, the first search result 420 can be updated to include information 421 from the first automated telephone call with Example Store 1 that indicates toilet paper was "available" at Example Store 1 at "9:00 today", but that Example Store 1 may run out of toilet paper "this afternoon". Further, the second search result 430 can be updated to include information 431 from the first automated telephone call with Example Store 2 that indicates toilet paper was "available" at Example Store 1 "this morning", and that Example Store 2 should "not run out today". Moreover, the third search result 440 can be updated to include information 441 from the first automated telephone call with Example Store 3 that indicates Example Store 3 "does not sell toilet paper". The information 421, 431 of the search results 420, 430 can be updated in a similar manner after the second automated telephone calls, and any other subsequent automated telephone call thereafter. In this manner, search result(s) associated with each of the entities of the group can be updated to reflect availability of various items that are associated with each of the corresponding entities as the automated telephone calls are performed by the automated assistant.

Although FIGS. 4A-4D are described herein with requesting a status update regarding a single item of interest, it should be understood that is for the sake of example and is not meant to be limiting. For example, if the automated assistant identifies a plurality of items of interest to request status updates for, and a given one of the entities in the group is associated with multiple of the items, then the automated assistant can request a status update regarding each of the multiple items in the first automated telephone call to avoid having to initiate and perform multiple automated telephone calls with the given entity to request the status update regarding each of the multiple items. Moreover, it should be noted that when the automated assistant requests status updates regarding multiple items, then a different time period can be assigned to a temporal delay for each of the multiple items. For example, if the automated assistant initially requests a status update regarding both toilet paper and hand sanitizer and the representative associated with the given entity provides information that indicates there is ample toilet for the rest of the day but no hand sanitizer for the next four days, then the automated assistant can assign a 24 hour time period to initiate and perform a subsequent automated telephone call to request a further status update regarding the toilet paper and a 96 hour time period to initiate and perform a subsequent automated telephone call to request a further status update regarding the hand sanitizer.

Moreover, although FIGS. 4A-4D are described herein with respect to requesting a status update regarding an item of interest, it should be understood that is for the sake of example and is not meant to be limiting. As one non-limiting example, the automated assistant can also request status updates regarding availability of services. For instance, if the automated assistant determines there is a surge in submitted queries for auto-body repair and/or roof repair (e.g., after a hail storm), then automated telephone calls can be initiated and performed in a similar manner and search result(s) associated with entities that provide these services can be updated in similar manner.

Referring now to FIGS. 5A-5D, various non-limiting examples of initiating, on behalf of a user, automated telephone calls with various entities and causing notifications associated with each of the various entities to be rendered based on results of the automated telephone calls are depicted. FIGS. 5A-5D each depict a computing device 510 having a graphical user interface 580 related to a user request to initiate and/or perform automated telephone calls on behalf of the user of the computing device 510. One or more aspects of an automated assistant associated with the user of the computing device 510 (e.g., automated assistant 115 of FIG. 1) may be implemented locally on the computing device 510 and/or on other computing device(s) that are in network communication with the computing device 510 in a distributed manner (e.g., via network(s) 190 of FIG. 1). For the sake of simplicity, operations of FIGS. 5A-5D are described herein as being performed by the automated assistant (e.g., using the automated request system 180 of FIG. 1). Although the computing device 510 of FIGS. 5A-5D is depicted as a mobile phone, it should be understood that is not meant to be limiting. The computing device 510 can be, for example, a server, a stand-alone speaker, a speaker connected to a graphical user interface, a laptop, a desktop computer, and/or any other client device capable of making telephonic calls and operating instances of the automated assistant.

The graphical user interface 580 of FIGS. 5A-5D further includes a textual reply interface element 584 that the user may select to generate user input via a virtual keyboard or other touch and/or typed input, and a voice reply interface element 585 that the user may select to generate user input via microphone(s) of the computing device 510. In some implementations, the user may generate user input via the microphone(s) without selection of the voice reply interface element 585. For example, active monitoring for audible user input via the microphone(s) may occur to obviate the need for the user to select the voice reply interface element 585. In some of those and/or in other implementations, the voice reply interface element 585 may be omitted. Moreover, in some implementations, the textual reply interface element 584 may additionally and/or alternatively be omitted (e.g., the user may only provide audible user input). The graphical user interface 580 of FIGS. 5A-5D also includes system interface elements 581, 582, 583 that may be interacted with by the user to cause the computing device 510 to perform one or more actions.

Figure 5A:
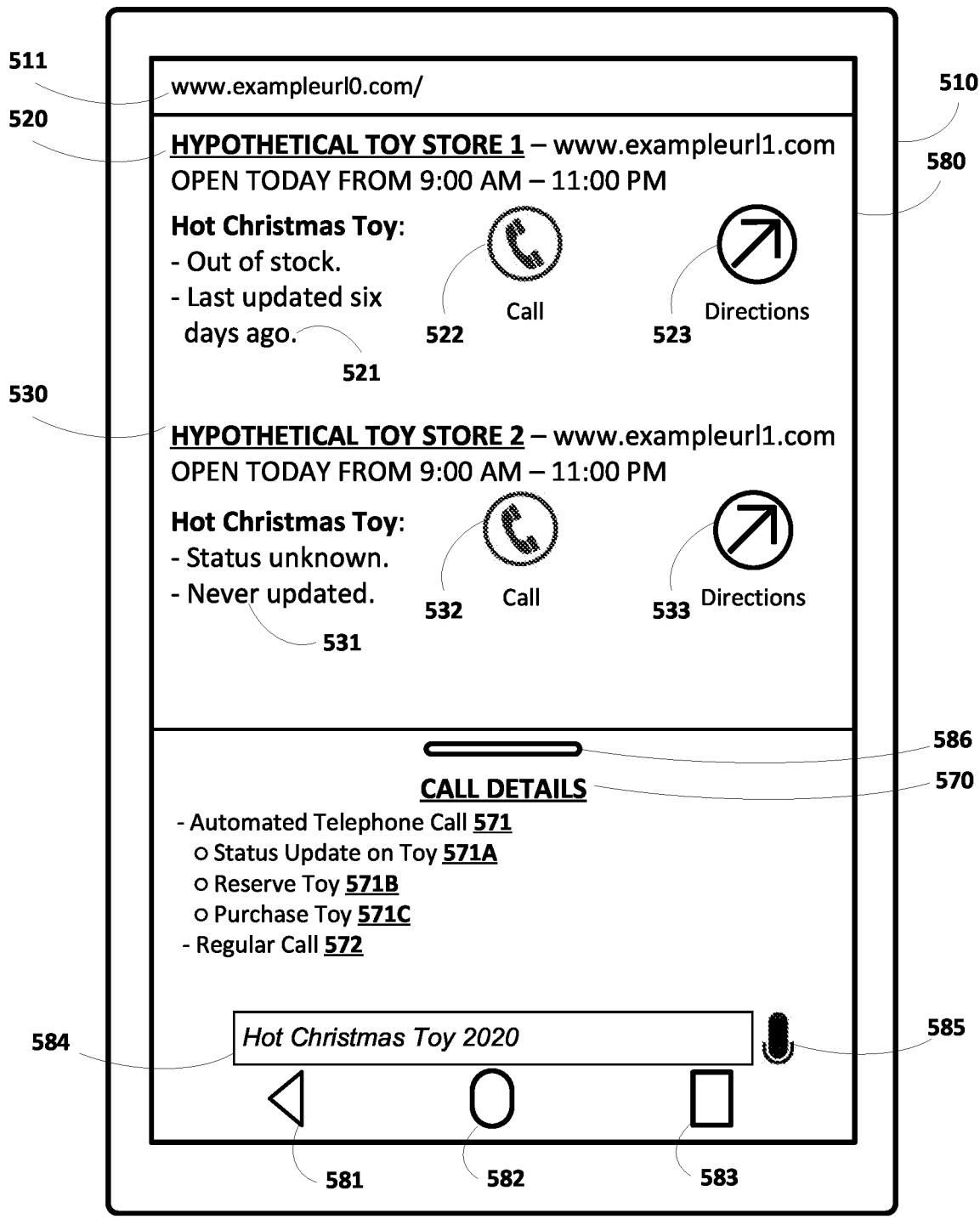
FIG. 5A, FIG. 5B, FIG. 5C, and FIG. 5D depict non-limiting examples of initiating, on behalf of a user, automated telephone calls with various entities and causing notifications associated with each of the various entities to be rendered based on results of the automated telephone calls, in accordance with various implementations.

In various implementations, the automated telephone call(s) can be initiated and performed responsive to receiving user input that requests the automated assistant initiate and perform the automated telephone call(s). The user input can be spoken input, touch input, and/or typed input that includes an indication to initiate and perform the automated telephone call(s). Further, the automated assistant can perform action(s), on behalf of a given user of the computing device 510, that is included in the request during the automated telephone call(s). As shown in FIG. 5A, the graphical user interface 580 includes a first search result 520 associated with a Hypothetical Toy Store 1 entity and a second search result 530 associated with a Hypothetical Toy Store 2 entity that are displayed responsive to a query of "Hot Christmas Toy 2020" (e.g., as indicated in the textual reply interface element 584). Further, the search results 520, 530 are displayed in a browser application accessible at the computing device (e.g., as indicated by URL 511 of "www.exampleurl0.com/"). Further, the search results 520, 530 can also include, for example, corresponding information 521, 531 related to one or more items of interest (e.g., Hot Christmas Toy). For example, first information 521 associated with the first search result 520 indicates that Hypothetical Toy Store 1 was out of stock of the Hot Christmas Toy six days ago, and second information 531 associated with the second search result 530 indicates that the status of Hot Christmas Toy is unknown for Hypothetical Toy Store 2 and that the status has never been updated.

In some implementations, the search results 520, 530 can be associated with various selectable graphical elements that, when selected, cause the computing device 510 to perform corresponding actions. For example, when a call graphical element 522, 532 associated with a given one of the search results 520, 530 is selected, the user input can indicate that a telephonic call should be initiated and performed. As another example, when a directions graphical element 523, 533 associated with a given one of the search results 520,530 is selected, the user input can indicate that a navigation action should be initiated and performed. In other implementations, and although not depicted, when a general automated telephone call graphical element is selected, the user input can explicitly indicate that automated telephonic call(s) should be initiated and performed.

In some implementations, and as shown in FIG. 5A, a call details interface 570 can be rendered at the computing device 510 responsive to receiving the user input to initiate and perform the telephonic call action with either entity (e.g., in response to receiving a selection one of the call interface elements 522, 532 or the general automated telephone call graphical element). In some versions of those implementations, the call details interface 570 can be rendered at the computing device 510 as part of the graphical user interface 580. In some other versions of those implementations, the call details interface 570 can be a separate interface from the graphical user interface 580 that overlays the user interface, and can include an interface element 586 that allows the user to expand the call details interface 570 to display additional call details (e.g., by swiping up on the interface element 586) and/or dismiss the call details interface 570 (e.g., by swiping down on the interface element 586). In other implementations, the call details interface 570 can be accessed and dismissed at any time using the interface element 586. Although the call details interface 570 is depicted as being at the bottom of the graphical user interface 580, it should be understood that is for the sake of example and not meant to be limiting. For example, the call details interface 570 can be rendered at a top of the graphical user interface 580, a side of the graphical user interface 580, or an entirely separate interface from the graphical user interface 580.

The call details interface 570 can include, in various implementations, a plurality of segments of selectable text (or graphical elements). In some implementations, the segments can be selectable, such that, when a given one of the segments is selected, the computing device 510 can perform the corresponding action. As shown in FIG. 5A, the call details interface 570 includes a first segment of selectable text 571 of "Automated Telephone Call", and a second segment of selectable text 572 of "Regular Call". Further, the first segment of selectable text 571 can, when selected, provide the automated assistant an indication of a desire to initiate automated telephone call(s) using the automated assistant, and the second segment of selectable text 572 can, when selected, cause the automated assistant to initiate a normal telephone call. Notably, in some versions of those implementations, the segments of selectable text can include other associated segments of selectable text. For example, the first segment of selectable text 571 of "Automated Telephone Call" can include a first other segment of selectable text 571A of "Status Update on Toy" associated with an action of requesting a status update during the automated telephone call(s), a second other segment of selectable text 571B of "Reserve Toy" associated with an action of placing the toy on hold, for the user of the computing device 510, during the automated telephone call(s), and a third other segment of selectable text 571C of "Purchase Toy" associated with an action of acquiring the toy, for the user of the computing device 510, during the automated telephone call(s). Although the automated telephone calls described herein with respect to FIGS. 5A-5D are initiated from a browser-based application, it should be understood that is for the sake of example, and not meant to be limiting. For example, the automated telephone call(s) can be initiated from various software applications accessible at the computing device 510 (e.g., an automated assistant application, a contacts application, an email application, a text or SMS messaging application, and/or other software application), and, if the automated telephone call(s) is initiated using spoken input, from a home screen of the computing device 510, from a locked screen of the computing device 510, and/or other states of the computing device 510.

For example, assume user input is detected at the computing device 510 to initiate and perform an automated telephone call with the first search result 520 of "Hypothetical Toy Store 1". The user input can be, for example, spoken input of "find Hot Christmas Toy 2020" or touch input directed to the call interface element 522 (and/or one of the segments of selectable text 571, 571A-571C). In various implementations, the automated assistant can identify a group of entities that are each stored in association with the "Hot Christmas Toy" in one or more databases (e.g., the entities database of 153A of FIG. 1) based on the user input being indicative of the "Hot Christmas Toy". In some implementations, the automated assistant can restrict the entities included in the group to those that are stored in association with the Hot Christmas Toy, and that are within a threshold distance of a location of the computing device 510 (e.g., determined based on GPS data generated by GPS sensor(s) of the computing device 510). For example, the automated assistant can initially include all entities that are stored in association with the Hot Christmas Toy, and that are within four miles of the location of the computing device 510, in the group of entities. If none, then the automated assistant can increase the threshold distance to include all entities that are within eight miles of the location of the computing device 510, and so on. In some additional and/or alternative implementations, the automated assistant may continue identifying entities to include in the group until a threshold number of entities are identified for inclusion in the group. For instance, the automated assistance can keep increasing the threshold distance to identify entities to include in the group until five entities are included in the group. If there are more than the threshold number of entities included in the group, then the entities that satisfy one or more criteria may be included in the group (e.g., as described in greater detail above with respect to the entity identification engine 153). Notably, even though the user input may be directed to initiating an automated telephone call with a specific entity, or not specify an entity, the group of entities associated with the Hot Christmas Toy may still be identified.

The automated assistant can initiate and perform automated telephone call(s) with one or more of the entities of the group until the request is satisfied. In some implementations, the automated assistant can initiate a first automated telephone call with a first entity of the group in response to receiving the user input, and determine a call initiation time to initiate performance of additional automated telephone calls with corresponding additional entities of the group. In some versions of those implementations, the call initiation time for each of the additional automated telephone calls can be a static threshold duration of time (e.g., 15 seconds, 30 seconds, 45 seconds, and/or other durations of time). For example, the automated assistant can initiate a first automated telephone call with a first entity of the group, initiate a second automated telephone call with a second entity of the group 30 seconds after initiating the first automated telephone call with the first entity, initiate a third automated telephone call with a third entity of the group 30 seconds after initiating the second automated telephone call with the second entity, and so on for each of the entities of the group. In other versions of those implementations, the automated assistant can determine each call initiation time based on historical call data (e.g., stored in historical call database 154A) associated with a corresponding one of the entities of the group. The historical call data can include, for example, an indication that the corresponding entity is associated with an IVR system and a duration of time to navigate the IVR system, an indication of a duration of time of previous automated telephone calls with the corresponding entity, an indication of a duration of an initial hold time during previous automated telephone calls with the corresponding entity, and/or other call data derived from previous automated telephone calls with each corresponding entity of the group. Determining the call initiation time associated with each of the entities of the group is described in greater detail herein (e.g., with respect to the request performance engine 154 of FIG. 1). Moreover, the automated assistant can cause corresponding notification(s) that include result(s) of the automated telephone call(s), prompts for the user of the computing device 510, and/or other information related to the automated telephone call(s) to be rendered at the computing device 510 (e.g., audibly via speaker(s) of the computing device 510 and/or visually via the graphical user interface 580 of the computing device 510).

Figure 5B:
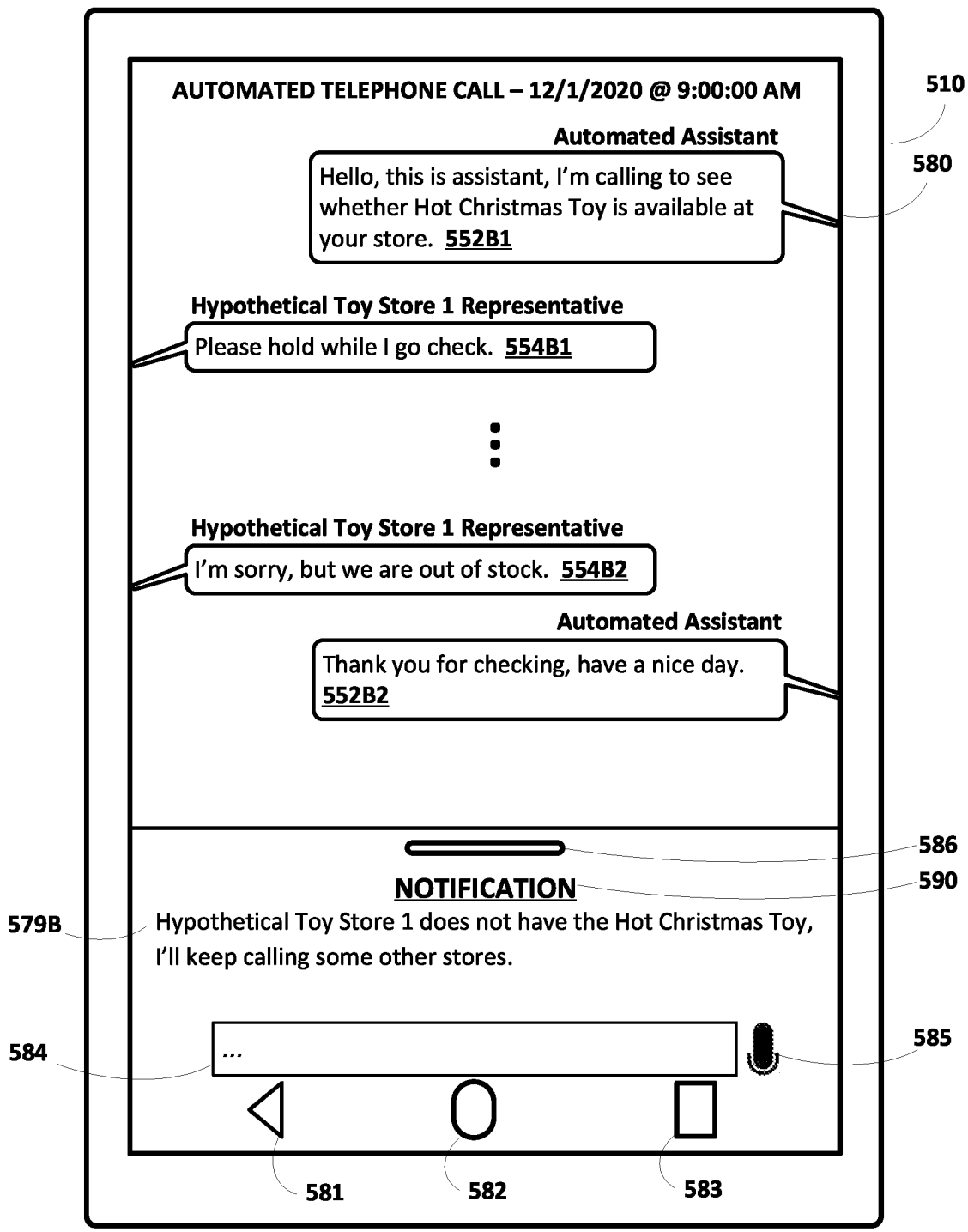

For example, referring specifically to FIG. 5B, assume user input is detected at the computing device 510 to initiate automated telephone call(s) to request status update(s) regarding Hot Christmas Toy (e.g., touch input directed to the first other selectable segment of text 571A of FIG. 5A or spoken input of "find Hot Christmas Toy"). Further assume the automated assistant identifies at least Hypothetical Toy Store 1 and Hypothetical Toy Store 2 as the entities in the group associated with Hot Christmas Toy. The automated assistant can initiate an automated telephone call with Hypothetical Toy Store 1, and request the status update regarding Hot Christmas Toy as the action to be performed based on the user input. For instance, the automated assistant can cause synthesized speech 552B1 to be rendered at a computing device associated with Hypothetical Toy Store 1 Representative (e.g., "I'm calling to see whether Hot Christmas Toy is available at your store"), and can process audio data corresponding to information 554B1 received responsive to the synthesized speech 552B1 (e.g., "please hold while I go check").

Further, the automated assistant can process audio data corresponding to further information 554A2 when Hypothetical Toy Store 1 Representative returns to the automated telephone call (e.g., "we are out of stock), and can cause further synthesized speech 552B2 to be rendered at the computing device associated with Hypothetical Toy Store 1 Representative (e.g., "thank you for checking"). Based on the result of the conversation, the automated assistant can cause notification 579B to be rendered visually at the graphical user interface (e.g., via notifications interface 590 that can supplant the call details interface 570, and that can be expanded or dismissed using the interface element 586 similar to the call details interface 570). Moreover, the automated assistant can cause the first search result 520 depicted in FIG. 5A to be updated to indicate that Hypothetical Toy Store 1 is out of stock of Hot Christmas Toy and optionally include a temporal indicator of when the further information 554B2 that indicated the Hot Christmas Toy was out of stock (e.g., "12/1/2020 at 9:00:00 AM", this morning, and so on). Updating the search results based on information received during automated telephone call(s) is described in greater detail above (e.g., with respect to FIGS. 1 and 4D).

During the automated telephone call with Hypothetical Toy Store 1, the automated assistant (or a separate instance thereof) can also initiate an additional automated telephone call with Hypothetical Toy Store 2 based on a determined call initiation time associated with Hypothetical Store 2. In some implementations, the call initiation time associated with Hypothetical Toy Store 2 can be zero, such that the automated assistant can perform the automated telephone call with Hypothetical Toy Store 1 and Hypothetical Toy Store 2 in parallel (e.g., in a similar manner as described above with respect to initiating and performing the first automated telephone calls in FIGS. 4A-4C). In other implementations, the additional automated telephone calls may be staggered such that the automated assistant (and/or separate instance(s) thereof) is generally only engaged with one entity at a given time. In some versions of those implementations, the call initiation time associated with Hypothetical Toy Store 2 can be a set duration of time associated with each of the entities in the group, such that each of the additional automated telephone calls are initiated 30 seconds after one another. In other versions of those implementations, the call initiation time associated with Hypothetical Toy Store 2 can be based on historical call data associated with Hypothetical Toy Store 1 and Hypothetical Toy Store 2.

In some additional and/or alternative versions of those implementations, the call initiation time associated with Hypothetical Toy Store 2 can be dynamic and based on progress of the conversation between the automated assistant and the Hypothetical Toy Store 1 Representative. For example, assume the call initiation time associated with Hypothetical Toy Store 2 determined according to one or more of the above techniques is 30 seconds. However, if the on hold period described above with respect to FIG. 5A exceeds the original 30 second call initiation time, then the call initiation time associated with Hypothetical Toy Store 2 may be adjusted to a dynamic time when the conversation with the Hypothetical Toy Store 1 Representative resumes (e.g., when the further information 554B2 is received). In contrast, assume that the Hypothetical Toy Store 1 Representative indicated in the further information 554B2 (or immediately in the information 554B1) that Hot Christmas Toy was available. In this example, the additional automated telephone call with Hypothetical Toy Store 2 can be proactively terminated. However, if the additional automated telephone call with Hypothetical Toy Store 2 has already been initiated and the automated assistant is engaged in an additional conversation with Hypothetical Toy Store 2 Representative, then the automated assistant may continue the conversation, but change the action to an action of requesting a status update regarding Hot Christmas Toy, and update search result(s) associated with Hypothetical Toy Store 2 accordingly. Determining the call initiation times associated with the entities of the group is described in greater detail herein (e.g., with respect to the request performance engine 154 of FIG. 1).

Figure 5C:
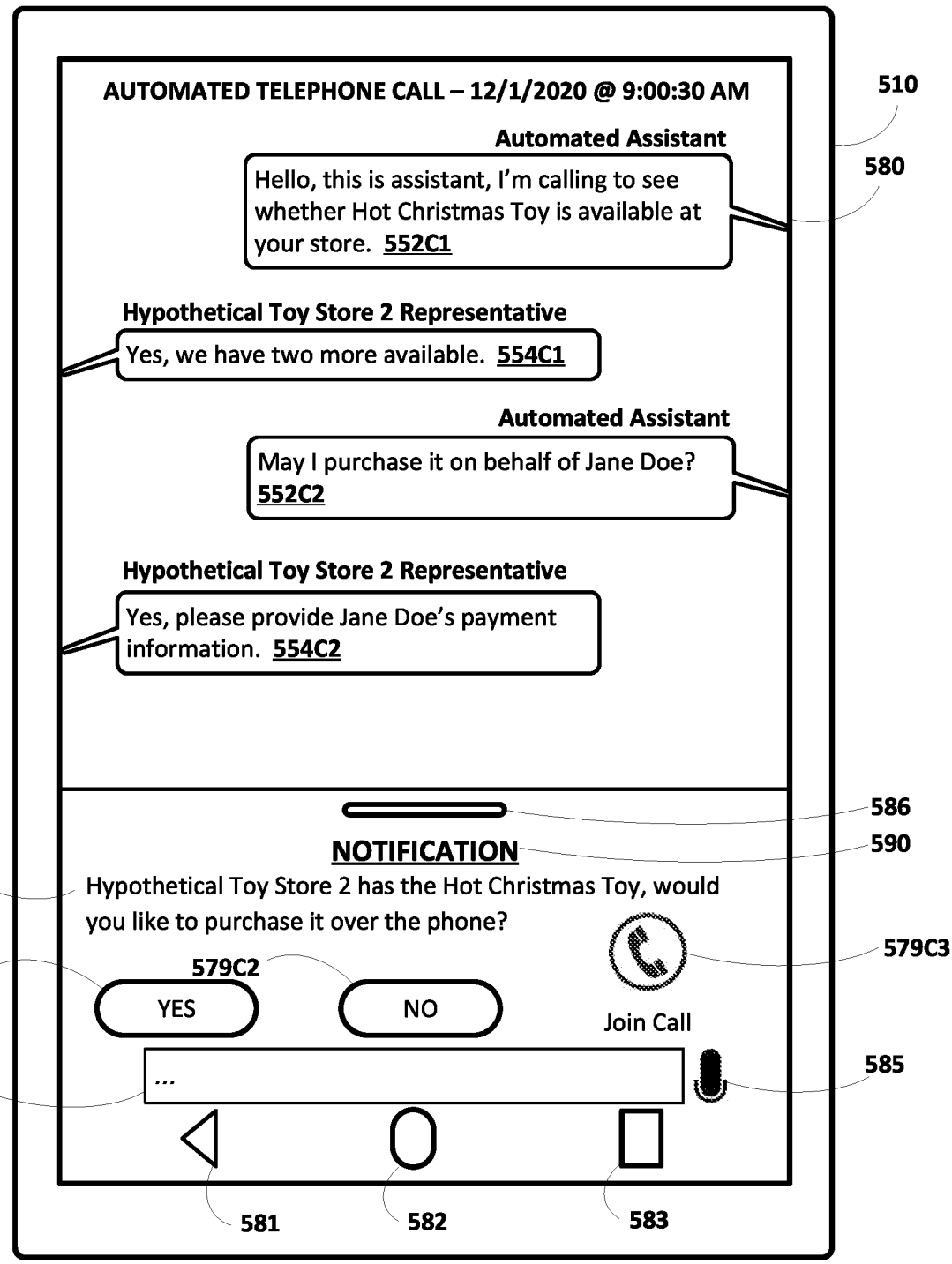

For example, referring specifically to FIG. 5C, assume user input is detected at the computing device 510 to initiate automated telephone call(s) to acquire Hot Christmas Toy on behalf of the user of the computing device 510. The user input can be, for example, touch input directed to the second other selectable segment of text 571B of FIG. 5A or spoken input of "find Hot Christmas Toy and buy it for me". Further assume that the result of the automated telephone call with the Hypothetical Toy Store 1 Representative indicates that Hypothetical Toy Store 1 is out of stock of Hot Christmas Toy based on the conversation depicted in FIG. 5B. Also assume that the additional automated telephone call with Hypothetical Toy Store 2 is initiated 30 seconds after the automated telephone call with Hypothetical Toy Store 1. Similar to the conversation described above with respect to FIG. 5B, the automated assistant can cause synthesized speech 552C1 to be rendered at a computing device associated with Hypothetical Toy Store 2 Representative (e.g., "I'm calling to see whether Hot Christmas Toy is available at your store"), and can process audio data corresponding to information 554C1 received responsive to the synthesized speech (e.g., "yes, we have two more available").

Further, the automated assistant can cause further synthesized speech 552C2 to be rendered at the computing device associated with Hypothetical Toy Store 2 Representative (e.g., "May I purchase it on behalf of Jane Doe", where Jane Doe is the user of the computing device 510), and process audio data corresponding to further information 554C2 when Hypothetical Toy Store 2 Representative that is responsive to the further synthesized speech 552C2. Based on the result of the conversation, the automated assistant can cause notification 579C to be rendered visually at the graphical user interface (e.g., via notifications interface 590 that can supplant the call details interface 570, and that can be expanded or dismissed using the interface element 586 similar to the call details interface 570).

Notably, the notification 579C can indicate that Hypothetical Toy Store 2 has Hot Christmas Toy, and can also include a prompt requesting the user of the computing device 510 (e.g., Jane Doe) authorize providing pecuniary information to the Hypothetical Toy Store 2 Representative to acquire the Hot Christmas Toy, on behalf of the user, at Hypothetical Toy Store 2. Moreover, the notification interface 590 can also include selectable graphical elements that are responsive to the prompt, such as a first selectable graphical element 579C1 to authorize providing of the pecuniary information, a second selectable graphical element 579C2, and a third selectable element 579C3 for the user to join the additional automated telephone call. In various implementations, the user of the computing device 510 may have previously authorized providing of the pecuniary information and the prompt may be omitted. If the user indicates that the automated assistant should provide the pecuniary information (e.g., via a selection of the first selectable graphical element 579C1), then the user can receive a further notification that indicates the Hot Christmas Toy was acquired, on behalf of the user of the computing device 510, at Hypothetical Store 2, provide directions to Hypothetical Toy Store 2, create a reminder to pick up the Hot Christmas Toy at Hypothetical Toy Store 2, and/or perform other actions based on the result(s) of the conversation during the additional automated telephone call with Hypothetical Toy Store 2. Moreover, once the automated assistant has acquired the Hot Christmas Toy, it may proactively terminate other ongoing automated telephone call(s) with other entities of the group.

Figure 5D:
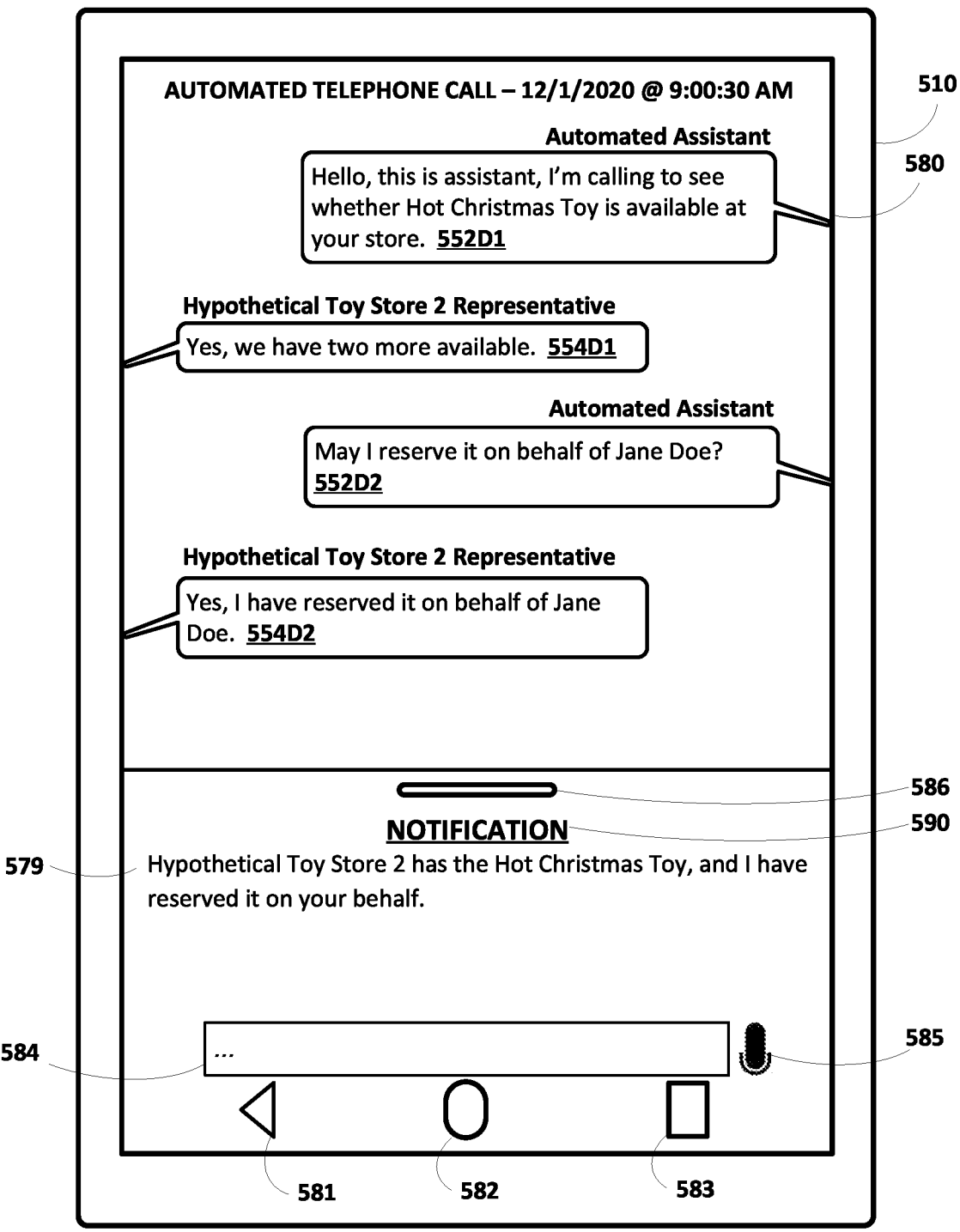

For example, referring specifically to FIG. 5D, assume user input is detected at the computing device 510 to initiate automated telephone call(s) to place Hot Christmas Toy on hold on behalf of the user of the computing device 510 (e.g., in contrast with the request to acquire the Hot Christmas Toy in FIG. 5C). The user input can be, for example, touch input directed to the third other selectable segment of text 571C of FIG. 5A or spoken input of "find Hot Christmas Toy and place it on hold for me"). Further assume that the result of the automated telephone call with the Hypothetical Toy Store 1 Representative indicates that Hypothetical Toy Store 1 is out of stock of Hot Christmas Toy based on the conversation depicted in FIG. 5B. Also assume that the additional automated telephone call with Hypothetical Toy Store 2 is initiated 30 seconds after the automated telephone call with Hypothetical Toy Store 1. Similar to the conversations described above with respect to FIGS. 5B and 5C, the automated assistant can cause synthesized speech 552D1 to be rendered at a computing device associated with Hypothetical Toy Store 2 Representative (e.g., "I'm calling to see whether Hot Christmas Toy is available at your store"), and can process audio data corresponding to information 554D1 received responsive to the synthesized speech (e.g., "yes, we have two more available").

Further, the automated assistant can cause further synthesized speech 554D2 to be rendered at the computing device associated with Hypothetical Toy Store 2 Representative (e.g., "May I reserve it on behalf of Jane Doe", where Jane Doe is the user of the computing device 510), and process audio data corresponding to further information 554D2 when Hypothetical Toy Store 2 Representative that is responsive to the further synthesized speech 552D2. Based on the result of the conversation, the automated assistant can cause notification 579D to be rendered visually at the graphical user interface (e.g., via notifications interface 590 that can supplant the call details interface 570, and that can be expanded or dismissed using interface element 586 similar to the call details interface 570). Notably, the notification 579D can indicate that Hypothetical Toy Store 2 has Hot Christmas Toy, and that the automated assistant has reserved it, on behalf of the user of the computing device 510, at Hypothetical Toy Store 2. Although not depicted in FIG. 5D, the automated assistant can further cause the computing device 510 to render navigation information to Hypothetical Toy Store 2, pickup instructions for when the user of the computing device 510 arrives at Hypothetical Toy Store 2 to pick up the Hot Christmas Toy, links to webpage(s) associated with Hypothetical Toy Store 2, an indication that a calendar entry or reminder has been created for picking up the Hot Christmas Toy at Hypothetical Toy Store 2, and so on.

In various implementations, the automated assistant can cause the first search result 520 depicted in FIG. 5A to be updated to indicate that Hypothetical Toy Store 1 is out of stock of Hot Christmas Toy, and optionally include a temporal indicator of when the further information 554B2 that indicated the Hot Christmas Toy was out of stock (e.g., "12/1/2020 at 9:00:00 AM", this morning, and so on). Further, the automated assistant can cause the second search result 530 depicted in FIG. 5A to be updated to indicate that Hypothetical Toy Store 2 has low stock of Hot Christmas Toy or that there is only one left, and optionally include a temporal indicator of when the information 554C1, 554D1 that indicated the Hot Christmas Toy was available (e.g., "12/1/2020 at 9:00:30 AM", this morning, and so on). Updating the search results based on information received during automated telephone call(s) is described in greater detail above (e.g., with respect to FIGS. 1 and 4D).

Moreover, other automated assistants associated with other users located in the same geographic region can leverage the information acquired by the automated assistant during the automated telephone calls to perform further actions. For example, if a neighbor of the user of the computing device 510 provides user input to a respective automated assistant to acquire the Hot Christmas Toy on behalf of the neighbor at 10:00 AM, then the neighbor's respective automated assistant can analyze the updated search result(s) and remove Hypothetical Toy Store 1 from any identified group since the Hot Christmas Toy was not available at Hypothetical Toy Store 1 at 9:00 AM, and may initiate an automated telephone call with Hypothetical Toy Store 2 to see if there is still any available. By leveraging the information obtained by the automated assistant of the computing device 510, the other automated assistants can conserve computational resources of their respective computing devices and computing devices associated with the entities.

Figure 6A:
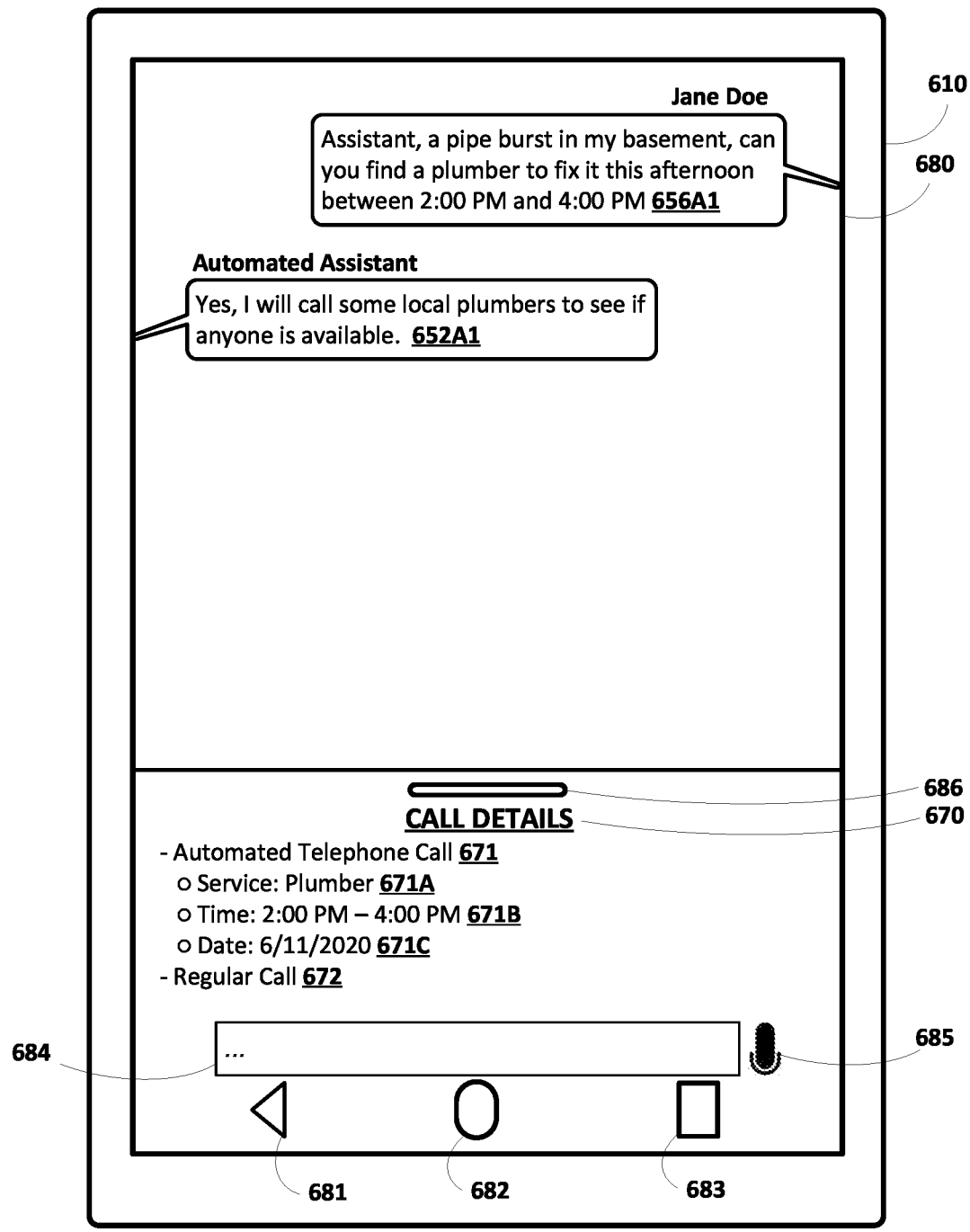
FIG. 6A, FIG. 6B, and FIG. 6C also depict non-limiting examples of initiating, on behalf of a user, automated telephone calls with various entities and causing notifications associated with each of the various entities to be rendered based on results of the automated telephone calls, in accordance with various implementations.
Figure 6B:
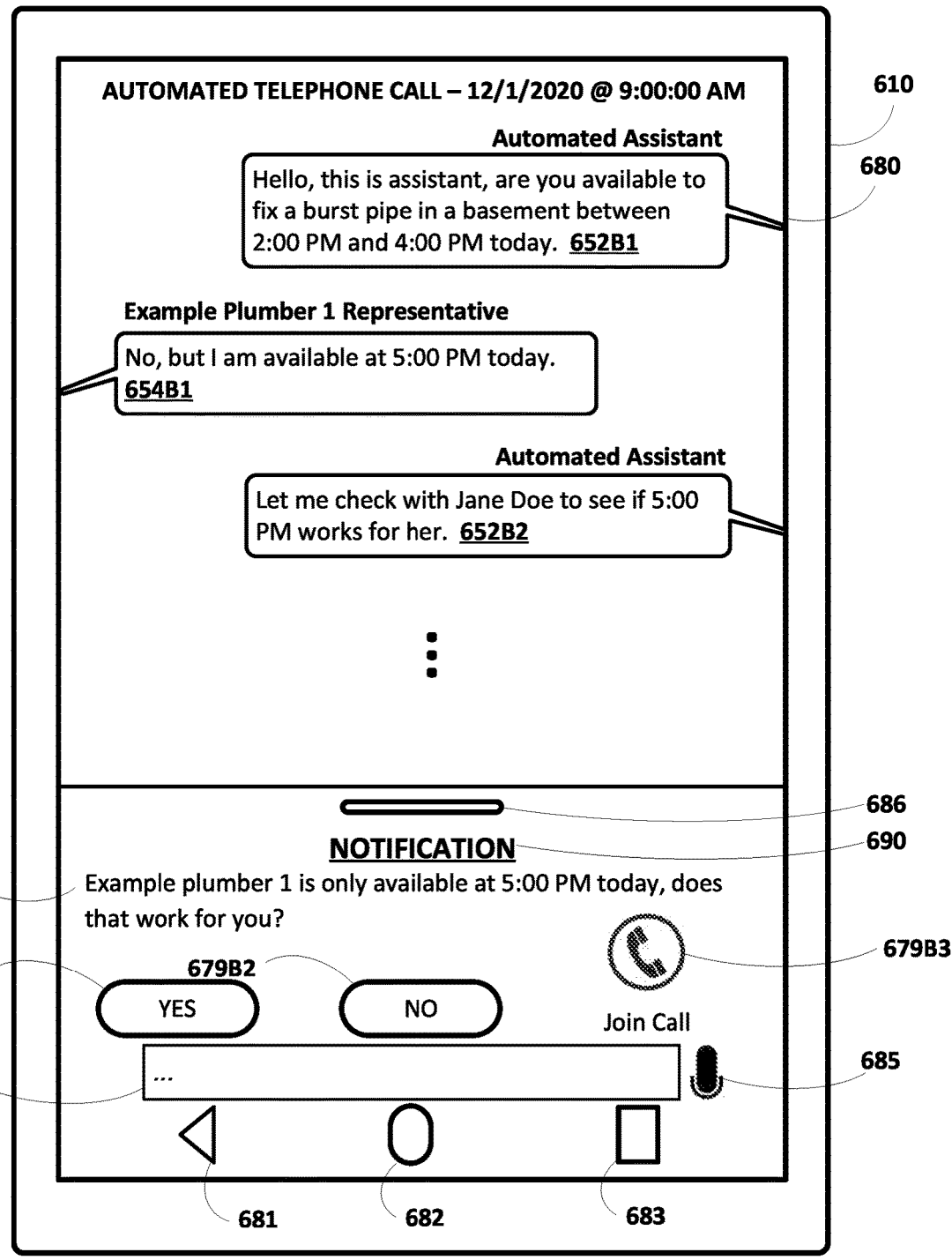
Figure 6C:
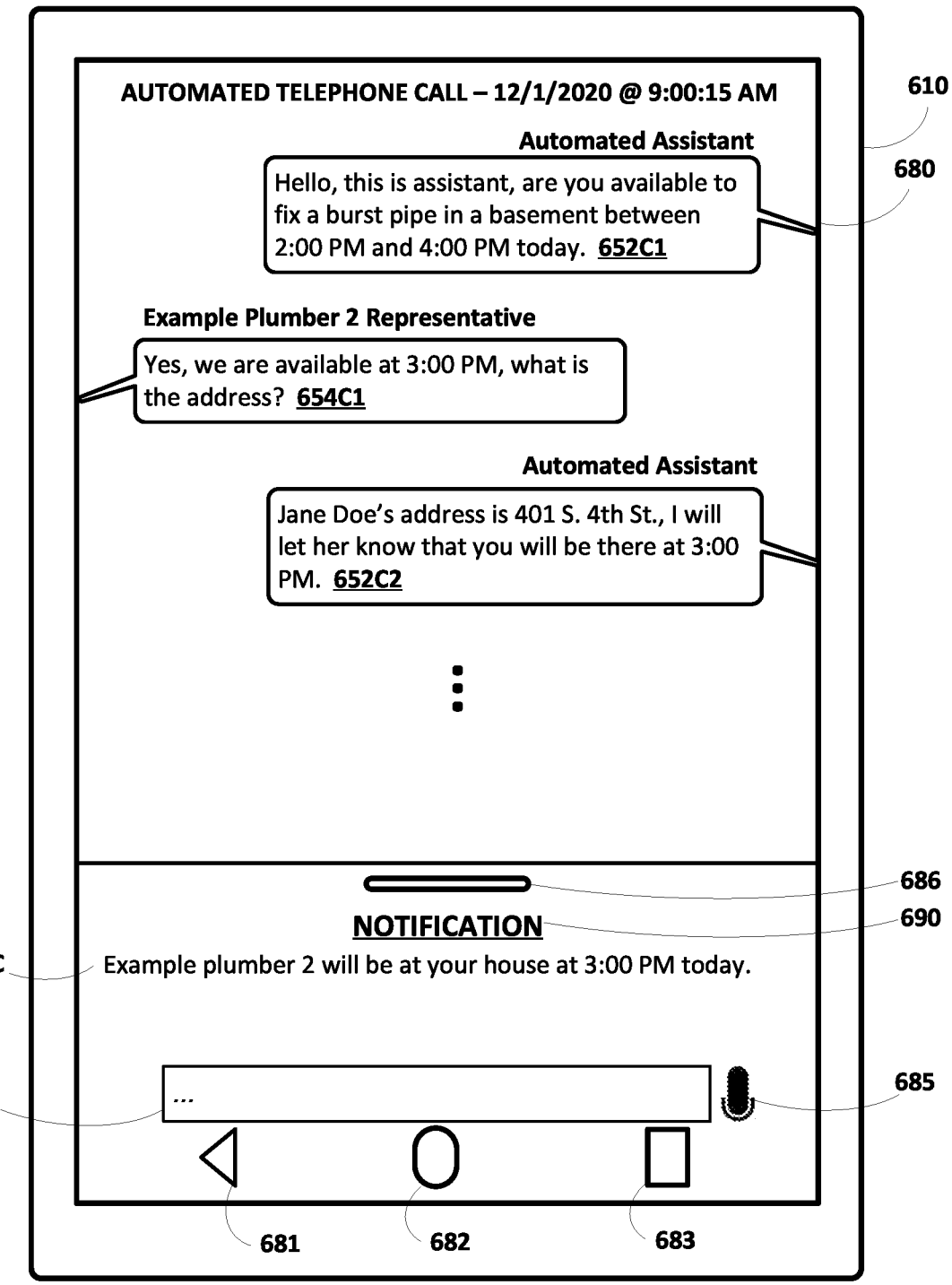

Although FIGS. 5A-5D are described herein as performing action(s) with respect to item(s) of interest on behalf of the user of the computing device 510, it should be understood that is for the sake of example and is not meant to be limiting. For example, referring now to FIGS. 6A-6C, additional non-limiting examples of initiating, on behalf of a user, automated telephone calls with various entities and causing notifications associated with each of the various entities to be rendered based on results of the automated telephone calls are depicted. However, in contrast with FIGS. 5A-5D, FIGS. 6A-6C are described herein with respect to requesting availability of an entity during a given time period. Similar to FIGS. 5A-5D, FIGS. 6A-6C each depict a computing device 610 having a graphical user interface 680 related to a user request to initiate and/or perform automated telephone calls on behalf of the user of the computing device 610. One or more aspects of an automated assistant associated with the user of the computing device 610 (e.g., automated assistant 115 of FIG. 1) may be implemented locally on the computing device 610 and/or on other computing device(s) that are in network communication with the computing device 610 in a distributed manner (e.g., via network(s) 190 of FIG. 1). For the sake of simplicity, operations of FIGS. 6A-6C are described herein as being performed by the automated assistant (e.g., using the automated request system 180 of FIG. 1). Although the computing device 610 of FIGS. 6A-6C is depicted as a mobile phone, it should be understood that is not meant to be limiting. The computing device 610 can be, for example, a server, a stand-alone speaker, a speaker connected to a graphical user interface, a laptop, a desktop computer, and/or any other client device capable of making telephonic calls and operating instances of the automated assistant.

The graphical user interface 680 of FIGS. 6A-6C further includes a textual reply interface element 684 that the user may select to generate user input via a virtual keyboard or other touch and/or typed input, and a voice reply interface element 685 that the user may select to generate user input via microphone(s) of the computing device 610. In some implementations, the user may generate user input via the microphone(s) without selection of the voice reply interface element 685. For example, active monitoring for audible user input via the microphone(s) may occur to obviate the need for the user to select the voice reply interface element 685. In some of those and/or in other implementations, the voice reply interface element 685 may be omitted. Moreover, in some implementations, the textual reply interface element 684 may additionally and/or alternatively be omitted (e.g., the user may only provide audible user input). The graphical user interface 680 of FIGS. 6A-6CD also includes system interface elements 681, 682, 683 that may be interacted with by the user to cause the computing device 610 to perform one or more actions.

In various implementations, the automated telephone call(s) can be initiated and performed responsive to receiving user input that is directed to the automated assistant, and that requests the automated assistant initiate and perform the automated telephone call(s). The user input can be spoken input, touch input, and/or typed input that includes an indication to initiate and perform the automated telephone call(s). Further, the automated assistant can perform action(s), on behalf of a given user of the computing device 610, that are included in the request during the automated telephone call(s). As shown in FIG. 6A, the graphical user interface 680 includes a conversation between the automated assistant and the user of the computing device 610 (e.g., Jane Doe). The conversation includes initial user input 656A1 (e.g., typed or spoken) that includes a request (e.g., "can you find a plumber . . . this afternoon between 2:00 PM and 4:00 PM"). The automated assistant can provide a response 652A1 (e.g., textual or synthesized speech) that indicates the automated assistant will "call some local plumbers to see if anyone is available".

In some implementations, and as shown in FIG. 6A, a call details interface 670 can be rendered at the computing device 610 responsive to receiving the user input 656A1. In some versions of those implementations, the call details interface 670 can be rendered at the computing device 610 as part of the graphical user interface 680. In some other versions of those implementations, the call details interface 670 can be a separate interface from the graphical user interface 680 that overlays the user interface, and can include an interface element 686 that allows the user to expand the call details interface 670 to display additional call details (e.g., by swiping up on the interface element 686) and/or dismiss the call details interface 670 (e.g., by swiping down on the interface element 686). In other implementations, the call details interface 670 can be accessed and dismissed at any time using the interface element 686. Although the call details interface 670 is depicted as being at the bottom of the graphical user interface 680, it should be understood that is for the sake of example and not meant to be limiting. For example, the call details interface 670 can be rendered at a top of the graphical user interface 680, a side of the graphical user interface 680, or an entirely separate interface from the graphical user interface 680.

The call details interface 670 can include, in various implementations, a plurality of segments of selectable text (or graphical elements). In some implementations, the segments can be selectable, such that, when a given one of the segments is selected, the computing device 610 can perform the corresponding action. As shown in FIG. 6A, the call details interface 670 includes a first segment of selectable text 671 of "Automated Telephone Call", and a second segment of selectable text 672 of "Regular Call". Further, the first segment of selectable text 671 can, when selected, provide the automated assistant an indication of a desire to initiate automated telephone call(s) using the automated assistant, and the second segment of selectable text 672 can, when selected, cause the automated assistant to initiate a normal telephone call. Notably, in some versions of those implementations, the segments of selectable text can include associated information for the automated telephone call(s). For example, the first segment of selectable text 671 of "Automated Telephone Call" can include a first portion of associated information 671A of "Service: Plumber" associated with the plumbing service included in the user input 656A1, a second portion of associated information 671B of "Time: 2:00 PM-4:00 PM" associated with a time the plumbing service included in the user input 656A1 is being requested during the automated telephone call(s), and a third portion of associated information 671C of "Date: Jun. 11, 2020" associated with a date the plumbing service included in the user input 656A1 is being requested during the automated telephone call(s). By displaying the portions of the information 671A, 671B, 671C associated with the automated telephone call(s), the user of the computing device 510 may be provided an opportunity to modify the service being requested, a requested time of the being requested, a requested date of the service being requested, and/or other information related to the service being requested by the user of the computing device 610. Although the automated telephone calls described herein with respect to FIGS. 6A-6C are initiated based on the user input directed to the automated assistant, it should be understood that is for the sake of example, and not meant to be limiting. For example, the automated telephone call(s) can be initiated from various software applications accessible at the computing device 610 (e.g., a browser-based application, a contacts application, an email application, a text or SMS messaging application, and/or other software application), and, if the automated telephone call(s) is initiated using spoken input, from a home screen of the computing device 610, from a locked screen of the computing device 610, and/or other states of the computing device 610.

For example, assume user input is detected at the computing device 610 to initiate and perform automated telephone call(s) to request availability of a plumbing service for a given time and date (e.g., as indicated by the portions of the information 671A, 671B, 671C). In various implementations, the automated assistant can identify a group of entities that are each stored in association with the "plumbing service" in one or more databases (e.g., the entities database of 153A of FIG. 1) based on the user input being indicative of the "plumbing service". In some implementations, the automated assistant can restrict the entities included in the group to those that are stored in association with the plumbing service, and that are within a threshold distance of a location of the computing device 610 (e.g., determined based on GPS data generated by GPS sensor(s) of the computing device 610). For example, the automated assistant can initially include all entities that are stored in association with the plumbing service, and that are within 10 miles of the location of the computing device 610, in the group of entities. If none, then the automated assistant can increase the threshold distance to include all entities that are within 20 miles of the location of the computing device 610, and so on. In some additional and/or alternative implementations, the automated assistant may continue identifying entities to include in the group until a threshold number of entities are identified for inclusion in the group. For instance, the automated assistance can keep increasing the threshold distance to identify entities to include in the group until five entities are included in the group. If there are more than the threshold number of entities included in the group, then the entities that satisfy one or more criteria may be included in the group (e.g., as described in greater detail above with respect to the entity identification engine 153). Notably, even though the user input may be directed to initiating an automated telephone call with a specific entity, or not specify an entity, the group of entities associated with the plumbing service may still be identified.

The automated assistant can initiate and perform automated telephone call(s) with one or more of the entities of the group until the request is satisfied. In some implementations, the automated assistant can initiate a first automated telephone call with a first entity of the group in response to receiving the user input 656A1 in FIG. 6A, and determine a call initiation time to initiate performance of additional automated telephone calls with corresponding additional entities of the group. As described in greater detail above (e.g., with respect to the request performance engine 154 of FIG. 1 and the call initiation time of FIG. 5A), the call initiation time for each of the additional automated telephone calls can be a static threshold duration of time, determined based on historical call data (e.g., stored in historical call database 154A) associated with a corresponding one of the entities of the group, and dynamically modified based on progress of the automated telephone call(s). Moreover, the automated assistant can cause corresponding notification(s) that include result(s) of the automated telephone call(s), prompts for the user of the computing device 510, and/or other information related to the automated telephone call(s) to be rendered at the computing device 510 (e.g., audibly via speaker(s) of the computing device 510 and/or visually via the graphical user interface 580 of the computing device 510).

For example, referring specifically to FIG. 6B, assume user input is detected at the computing device 510 to initiate automated telephone call(s) to request availability of a plumbing service (e.g., touch input directed to the first selectable graphical element 671 of FIG. 6A or spoken input corresponding to the user input 656A1). Further assume the automated assistant identifies at least Example Plumber 1 and Example Plumber 2 as the entities in the group associated with plumbing services. The automated assistant can initiate an automated telephone call with Example Plumber 1, and request the status update regarding availability of the plumbing service as the action to be performed based on the user input. For instance, the automated assistant can cause synthesized speech 652B1 to be rendered at a computing device associated with Example Plumber 1 Representative (e.g., "are you available to fix a burst pipe in a basement between 2:00 PM and 4:00 PM today"), and can process audio data corresponding to information 654B1 received responsive to the synthesized speech 652B1 (e.g., "No, but I am available today at 5:00 PM").

Further, the automated assistant can cause further synthesized speech 652B2 to be rendered at the computing device associated with Example Plumber 1 Representative (e.g., "Let me check with Jane Doe to see if 5:00 PM works for her") responsive to receiving the information 654B1. Based on the result of the conversation, the automated assistant can cause notification 679B to be rendered visually at the graphical user interface (e.g., via notifications interface 690 that can supplant the call details interface 670, and that can be expanded or dismissed using the interface element 686 similar to the call details interface 670). Notably, the notification 679B can include an indication that Example Plumber 1 is not available during the given time period (e.g., between 2:00 PM and 4:00 PM), but is available at a time period subsequent to the given time period (e.g., available at 5:00 PM), and can also include a prompt (e.g., "does that work for you?"). Moreover, the prompt may cause selectable graphical elements that are responsive to the prompt to be rendered in the notifications interface 590. The selectable graphical elements can include, for example, a first selectable graphical element 679B1 to authorize reserving of the 5:00 PM time, a second selectable graphical element 679B2 to decline reserving the time of 5:00 PM, and a third selectable element 679B3 for the user to join the additional automated telephone call. In various implementations, the automated assistant may further provide name information, contact information, and address information to the Example Plumber 1 Representative if the user of the computing device 610 selects the first selectable graphical element 679B1 (or otherwise affirms the 5:00 PM time). However, if the user does not respond to the prompt within a threshold duration of time (e.g., 30 seconds, 45 seconds, and/or other durations of time), then the automated assistant may proactively terminate the automated telephone call with the Example Plumber 1 Representative to avoid wasting further computational resources. More particularly, the automated assistant can cause yet further synthesized speech to be rendered at the computing device of the Example Plumber 1 Representative to indicate the user's response to the prompt (or lack thereof), and the automated assistant can optionally cause a further notification to be rendered via the notifications interface 590.

During the automated telephone call with Example Plumber 1, the automated assistant (or a separate instance thereof) can also initiate an additional automated telephone call with Example Plumber 2 based on a determined call initiation time associated with Example Plumber 2. In some implementations, the call initiation time associated with Example Plumber 2 can be zero, such that the automated assistant can perform the automated telephone call with Example Plumber 1 and Example Plumber 2 in parallel (e.g., in a similar manner as described above with respect to initiating and performing the first automated telephone calls in FIGS. 4A-4C). In other implementations, the additional automated telephone calls may be staggered such that the automated assistant (and/or separate instance(s) thereof) is generally only engaged with one entity at a given time. In some versions of those implementations, the call initiation time associated with Example Plumber 2 can be a set duration of time associated with each of the entities in the group, such that each of the additional automated telephone calls are initiated 30 seconds after one another. In other versions of those implementations, the call initiation time associated with Example Plumber 2 can be based on historical call data associated with Example Plumber 1 and Example Plumber 2. In some additional and/or alternative versions of those implementations, the call initiation time associated with Example Plumber 2 can be dynamic and based on progress of the conversation between the automated assistant and the Example Plumber 1 Representative as described in greater detail above (e.g., with respect to FIG. 5B).

For example, referring specifically to FIG. 6C, assume user input is detected at the computing device 610 to initiate automated telephone call(s) to reserve a plumbing service on behalf of the user of the computing device 610. Further assume that the result of the automated telephone call with the Example Plumber 1 Representative indicates that Example Plumber 2 is not available during the given time period based on the conversation depicted in FIG. 6B. Also assume that the additional automated telephone call with Example Plumber 2 is initiated 15 seconds after the automated telephone call with Example Plumber 1. Similar to the conversation described above with respect to FIG. 6B, the automated assistant can cause synthesized speech 652C1 to be rendered at a computing device associated with Example Plumber 2 Representative (e.g., "are you available . . . between 2:00 PM and 4:00 PM today"), and can process audio data corresponding to information 554C1 received responsive to the synthesized speech (e.g., "yes, we are available at 3:00 PM, what's the address").

Further, the automated assistant can cause further synthesized speech 652C2 to be rendered at the computing device associated with the Example Plumber 2 Representative (e.g., "Jan Doe's address is 401 S. 4th St.", where Jane Doe is the user of the computing device 610). Based on the result of the conversation, the automated assistant can cause notification 679C to be rendered visually at the graphical user interface (e.g., via notifications interface 690 that can supplant the call details interface 670, and that can be expanded or dismissed using interface element 686 similar to the call details interface 670). Notably, the notification 679C can indicate that Example Plumber 2 is available at the given time period (e.g., 3:00 PM falling with the desired time range of 2:00 PM and 4:00 PM). Moreover, the automated assistant may reserve the time for the user of the computing device 610 and render the notification 679C of FIG. 6C prior to receiving any further user input responsive to the prompt of FIG. 6B. In this example, the automated assistant may automatically dismiss the notification and prompt of FIG. 6B. In this manner, the automated assistant can also request available time periods from various entities, and reserve a given one of the available time periods for the user of the computing device 610.

In various implementations, and although not shown in FIG. 4A-4C, 5B-5C, 6B, or 6C, the automated assistant may prompt the representatives associated with the entities of the group to consent to engaging in the conversation with the automated assistant upon initiating each of the corresponding automated telephone calls. For example, with respect to FIG. 4A, the automated assistant can cause synthesized speech of "Do you consent to engaging in a conversation with an automated assistant" to be rendered at the computing device of the Example Store 1 Representative prior to causing rendering of the synthesized speech 452A1. If the automated assistant received information responsive to the prompt that indicates the Example Store 1 Representative consents to engaging in the conversation, then the automated assistant can continue the conversation in the manner described above with respect to FIG. 4A. Moreover, the automated assistant may not request that Example Store 1 Representative consent to engaging in the conversation with the example representative during the second automated telephone call since Example Store 1 Representative has already consented to engaging in the conversation. However, if the automated assistant does not receive information responsive to the prompt that indicates the Example Store 1 Representative consents to engaging in the conversation, then the automated assistant can terminate the first automated call with Example Store 1 Representative.

Figure 7:
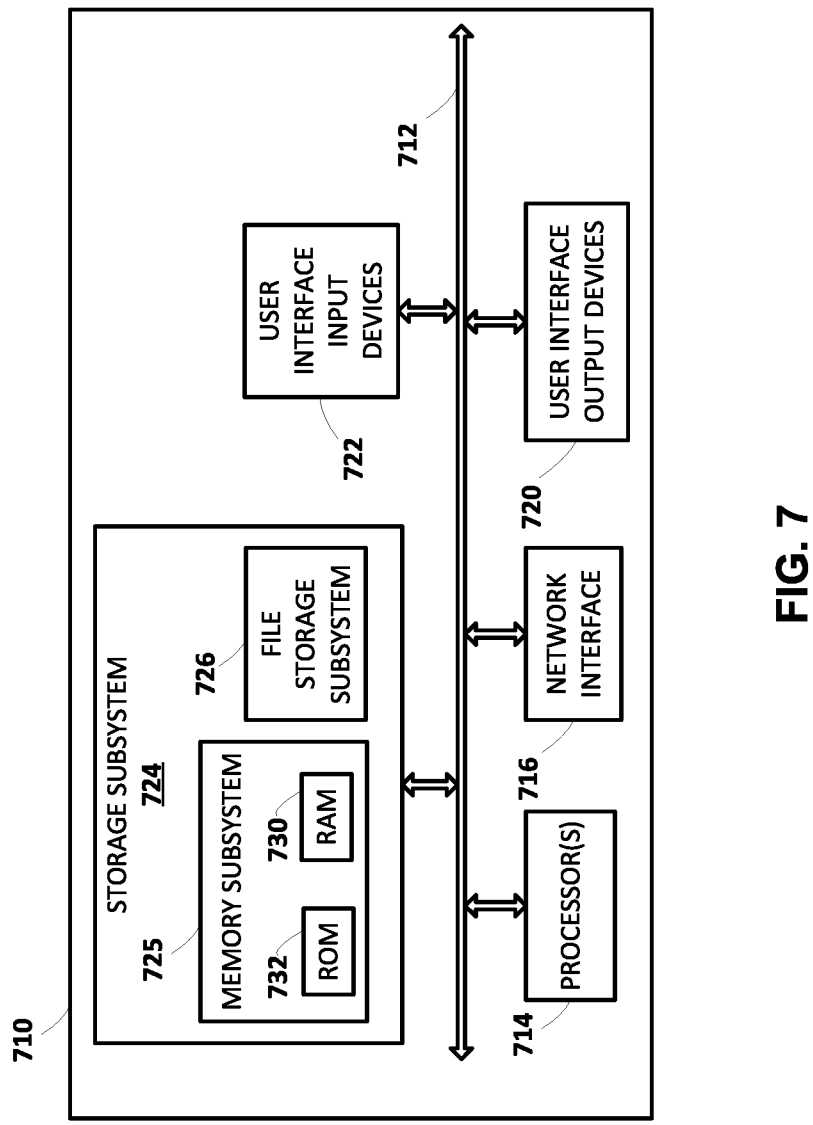
FIG. 7 depicts an example architecture of a computing device, in accordance with various implementations.

FIG. 7 is a block diagram of an example computing device 710 that may optionally be utilized to perform one or more aspects of techniques described herein. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes identifying an item of interest, identifying a group of entities associated with the item of interest, and initiating, by an automated assistant, performance of a corresponding automated telephone call with each of the entities of the group to render one or more corresponding instances of synthesized speech that request a corresponding status update regarding the item of interest. The method further includes, during performance of the corresponding automated telephone call with a given entity, of the entities, of the group: requesting, through rendering of one or more of the corresponding instances of synthesized speech, the corresponding status update regarding the item of interest from a representative associated with the given entity, and receiving, from the representative associated with the given entity, information regarding the item of interest responsive to requesting the corresponding status update. The method further includes determining, based on the received information regarding the item of interest, a temporal delay before initiating performance of a subsequent corresponding automated telephone call with the given entity to request a further corresponding status update regarding the item of interest, and initiating, by the automated assistant, performance of the subsequent corresponding automated telephone call with the given entity responsive to lapse of the temporal delay.

These and other implementations of technology disclosed herein can optionally include one or more of the following features.

In some implementations, the received information regarding the item of interest indicates availability of the item of interest at the given entity and an available quantity of the item of interest at the given entity.

In some versions of those implementations, determining the temporal delay based on the received information regarding the item of interest includes determining whether the available quantity of the item of interest at the given entity satisfies a quantity threshold, and in response to determining that the available quantity of the item of interest at the given entity satisfies the quantity threshold, assigning a first period of time as the temporal delay. In some further versions of those implementations, the method further includes in response to determining that the available quantity of the item of interest the given entity fails to satisfy the quantity threshold, assigning a second period of time as the temporal delay. The second period of time is of a shorter temporal duration than the first period of time and, as a result, lapses prior to the first period of time. In yet further versions of those implementations, the second period of time lapses during a same day that the automated call was initiated, and the first period of time lapses during a following day that is subsequent to the same day that the automated call was initiated.

In some versions of those implementations, the method further includes updating a search result associated with the given entity to indicate one or more of: the availability of the item of interest at the given entity, or the available quantity of the item of interest at the given entity. In some further versions of those implementations, the method further includes analyzing the updated search results associated with the given entity and previously updated search results associated with the given entity, and based on analyzing the updated search results and the previously updated search results: predicting, for a future time, future availability of the item of interest at the given entity, or predicting, for the future time, a future available quantity of the item of interest at the given entity.

In some implementations, the method further includes, during performance of the corresponding automated telephone call with the given entity: verifying whether the given entity is associated with the item of interest, and wherein determining the temporal delay is in response to determining that the given entity is associated with the item of interest based on the verifying. In some versions of those implementations, the method further includes, in response to determining that the given entity is not associated with the item of interest based on the verifying: refraining from determining the temporal delay; and removing the given entity from the group of entities associated with the item of interest. Removing the given entity from the group of entities associated with the item of interest prevents initiation of any subsequent automated call, with the given entity, that is related to the item of interest.

In some implementations, the representative associated with the given entity is one of: a human representative, or an additional automated assistant associated with the given entity.

In some implementations, initiating performance of the corresponding automated telephone call with each of the entities of the group to request the corresponding status update regarding the item of interest includes initiating performance of the corresponding automated telephone call with the given entity, and simultaneously initiating performance of at least an additional corresponding automated telephone call with an additional entity, of the entities, of the group. In some versions of those implementations, the method further includes, during performance of the additional corresponding automated telephone call with the additional entity: requesting through rendering of the one or more of the corresponding instances of synthesized speech, the corresponding status update regarding the item of interest from an additional representative associated with the additional entity, and receiving, from the additional representative associated with the additional entity, additional information regarding the item of interest responsive to requesting the corresponding status update. The method further includes determining, based on the received additional information regarding the item of interest, an additional temporal delay before initiating performance of a subsequent additional corresponding automated telephone call with the additional entity to request the further corresponding status update regarding the item of interest. A first time period is assigned to the temporal delay, and a distinct second time period is assigned to the additional temporal delay. The method further includes initiating, by the automated assistant, performance of the subsequent additional corresponding automated telephone call with the additional entity responsive to lapse of the additional temporal delay.

In some implementations, identifying the group of the entities associated with the item of interest includes accessing one or more databases to identify the entities stored in association with the item of interest as the group of the entities. In some versions of those implementations, each of the entities of the identified group are located within a particular geographic region.

In some implementations, the method requesting the status update regarding the item of interest from the representative associated with the given entity further includes generating synthesized speech audio data that captures one or more of the corresponding instances of synthesized speech that request the corresponding status update regarding the item of interest, and rendering of one or more of the corresponding instances of synthesized speech includes causing the synthesized speech to be rendered at an additional computing device of the representative associated with the given entity.

In some implementations, a method implemented by one or more processors is provided, and includes receiving, from a computing device of a user, a request to initiate performance of an automated telephone call on behalf of the user, identifying, based on the request, an action to be performed during the automated telephone call, identifying, based on the action to be performed during the automated call, a group of entities that are each capable of satisfying the request, and initiating, by an automated assistant, performance of the automated telephone call with a given entity, of the entities, of the group. The method further includes, during performance of the automated telephone call with the given entity: engaging in a conversation with a representative associated with the given entity to perform the action through rendering of one or more corresponding instances of synthesized speech related to the request, and initiating, by the automated assistant, performance of an additional automated telephone call with an additional entity, of the entities, of the group. The method further includes generating a notification that includes a result of the conversation with the representative, and causing the notification to be rendered via the computing device of the user.

These and other implementations of technology disclosed herein can optionally include one or more of the following features.

In some implementations, the method further includes determining, based on the result of the conversation during performance of the automated telephone call, the given entity will satisfy the request, and in response to determining that the given entity will satisfy the request, terminating performance of the additional automated telephone call with the additional entity.

In some implementations, the method further includes determining, upon initiating performance of the automated telephone call with the given entity, that the representative associated with the given entity has placed the automated telephone call on hold, determining that the representative associated with the given entity has resumed the automated telephone call, and initiating performance of the additional automated telephone call with the additional entity is in response to determining that the representative associated with the given entity has resumed the automated telephone call.

In some implementations, the method further includes, during performance of the corresponding automated telephone call with the given entity: determining, based on historical call data associated with the entity, a call initiation time to initiate performance of the additional automated telephone call with the additional entity, and initiating performance of the additional automated telephone call with the additional entity is in response to determining a current time matches the call initiation time. In some versions of those implementations, the historical call data associated with the additional entity includes one or more of: an indication that the entity is associated with an interactive voice response system and a duration of time to navigate the interactive voice response system, an indication of a duration of time of previous automated telephone calls with the entity, or an indication of a duration of an initial hold time during previous automated telephone calls with the entity.

In some implementations, the action to be performed during the automated telephone call includes requesting a status update regarding an item of interest associated with the entities of the group. In some versions of those implementations, engaging in the conversation with the representative associated with the given entity to perform the action includes requesting the status update regarding the item of interest from the representative associated with the given entity, and receiving, from the representative associated with the given entity, information regarding the item of interest responsive to requesting the status update.

In some further versions of those implementations, the received information regarding the item of interest indicates availability of the item of interest at the given entity, and the notification that includes the result of the conversation indicates that the item of interest is available at the given entity.

In yet further versions of those implementations, the method further includes in response to determining that the received information regarding the item of interest indicates availability of the item of interest, requesting that the representative associated with the given entity place the item of interest on hold, at the given entity, for the user, and the notification that includes the result of the conversation further indicates the item of interest was placed on hold, at the given entity, for the user. In yet further versions of those implementations, the method further includes, in response to determining that the received information regarding the item of interest indicates availability of the item of interest, submitting, to the representative associated with the given entity, and on behalf of the user, additional information to acquire the item of interest. In even yet further versions of those implementations, the notification that includes the result of the conversation further requests authorization, from the user, to submit the additional information submitted to acquire the item of interest. In even yet further versions of those implementations, the notification that includes the result of the conversation further indicates that the additional information was submitted to acquire the item of interest.

In yet further versions of those implementations, the notification further requests that the user join the automated telephone call. In yet further versions of those implementations, the item of interest is specified in the request to initiate performance of the automated telephone call on behalf of the user. In yet further versions of those implementations, the method further includes, in response to determining that the item of interest is available at the given entity, terminating performance of the additional automated telephone call with the additional entity.

In some further versions of those implementations, the received information regarding the item of interest indicates the item of interest is not available at the given entity, and the notification that includes the result of the conversation indicates that the item of interest is not available at the given entity. In yet further versions of those implementations, the method further includes, in response to determining that the item of interest is not available at the given entity, terminating performance of the automated telephone call with the given entity.

In some implementations, the action to be performed during the automated telephone call includes requesting availability of the entities of the group during a given period of time. In some versions of those implementations, engaging in the conversation with the representative associated with the given entity to perform the action includes requesting, from the representative associated with the given entity, the availability of the given entity during the given period of time, and receiving, from the representative associated with the given entity, information regarding the availability of the given entity during the given period of time.

In some further versions of those implementations, the received information indicates that the given entity is available during the given period of time, and the notification that includes the result of the conversation indicates that the given entity is available during the given period of time. In yet further versions of those implementations, the method further includes, in response to determining that the given entity is available during the given period of time: requesting that the representative associated with the given entity hold the given time period, available for given entity, for the user, and the notification that includes the result of the conversation further indicates the given time period, available for the given entity, is being held for the user. In yet further versions of those implementations, the notification further requests that the user join the automated telephone call. In yet further versions of those implementations, the method further includes, in response to determining that the given entity is available during the given period of time, terminating performance of the additional automated telephone call with the additional entity.

In some further versions of those implementations, the received information indicates that the given entity is not available during the given period of time, and the notification that includes the result of the conversation indicates that the given entity is not available during the given period of time. In yet further versions of those implementations, the method further includes, in response to determining that the given entity is not available during the given period of time, terminating performance of the automated telephone call with the given entity.

In some implementations, identifying the group of the entities that are each capable of satisfying the request includes identifying a location of the computing device of the user, determining whether the entities are within a threshold distance of the location of the computing device of the user, determining whether the entities are capable of satisfying the request, and in response to determining the entities are within the threshold distance of the location of the computing device and in response to determining the entities are capable of satisfying the request, including the entities in the group of entities. In some versions of those implementations, the method further includes, subsequent to receiving the request to initiate performance of the automated telephone call on behalf of the user, receiving from an additional computing device of an additional user, an additional request to initiate performance of a separate automated telephone call on behalf of the additional user. The additional request from the additional user is the same as the request from the user. The method further includes refraining, based on the result of the conversation with the representative associated with the given entity or an additional result of an additional conversation with an additional representative associated with the additional entity, from initiating the separate automated telephone call, generating an additional notification that includes the result of the conversation with the representative or an additional result of the additional conversation with the additional representative, and causing the additional notification to be rendered via the additional computing device of the user.

In some implementations, receiving the request to initiate performance of the automated telephone call on behalf of the user includes one of: receiving touch or typed input at the computing device of the user via a search interface or an automated assistant interface, or receiving spoken input via one or more microphones of the computing device of the user.

In some implementations, the representative associated with the given entity is one of: a human representative, or an additional automated assistant associated with the given entity.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors comprising:
    receiving, from a computing device of a user, a request to initiate performance of an automated telephone call on behalf of the user;
    identifying, based on the request, an action to be performed during the automated telephone call;
    identifying, based on the action to be performed during the automated call, a group of entities that are each capable of satisfying the request, wherein the action to be performed during the automated telephone call comprises requesting availability of the entities of the group during a given period of time;
    initiating, by an automated assistant, performance of the automated telephone call with a given entity, of the entities, of the group;
    during performance of the automated telephone call with the given entity:
        requesting, from a representative associated with the given entity, the availability of the given entity during the given period of time; and
        receiving, from the representative associated with the given entity, information regarding the availability of the given entity during the given period of time; and
        initiating, by the automated assistant, performance of an additional automated telephone call with an additional entity, of the entities, of the group;
    generating a notification that includes the availability of the given entity during the given period of time; and
    causing the notification to be rendered via the computing device of the user.

2. The method of claim 1, further comprising:
    determining, based on the availability of the given entity during the given period of time, the given entity will satisfy the request; and in response to determining that the given entity will satisfy the request, terminating performance of the additional automated telephone call with the additional entity.

3. The method of claim 1, further comprising:
determining, upon initiating performance of the automated telephone call with the given entity, that the representative associated with the given entity has placed the automated telephone call on hold;
determining that the representative associated with the given entity has resumed the automated telephone call; and
wherein initiating performance of the additional automated telephone call with the additional entity is in response to determining that the representative associated with the given entity has resumed the automated telephone call.

4. The method of claim 1, further comprising, during performance of the corresponding automated telephone call with the given entity:
determining, based on historical call data associated with the entity, a call initiation time to initiate performance of the additional automated telephone call with the additional entity; and
wherein initiating performance of the additional automated telephone call with the additional entity is in response to determining a current time matches the call initiation time.

5. The method of claim 4, wherein the historical call data associated with the additional entity includes one or more of:
an indication that the entity is associated with an interactive voice response system and a duration of time to navigate the interactive voice response system;
an indication of a duration of time of previous automated telephone calls with the entity; or
an indication of a duration of an initial hold time during previous automated telephone calls with the entity.

6. The method of claim 1, wherein identifying the group of the entities that are each capable of satisfying the request comprises:
identifying a location of the computing device of the user;
determining whether the entities are within a threshold distance of the location of the computing device of the user;
determining whether the entities are capable of satisfying the request; and
in response to determining the entities are within the threshold distance of the location of the computing device and in response to determining the entities are capable of satisfying the request, including the entities in the group of entities.

7. The method of claim 6, subsequent to receiving the request to initiate performance of the automated telephone call on behalf of the user, further comprising:
receiving from an additional computing device of an additional user, an additional request to initiate performance of a separate automated telephone call on behalf of the additional user, wherein the additional request from the additional user is the same as the request from the user;
refraining, based on the result of the conversation with the representative associated with the given entity or an additional result of an additional conversation with an additional representative associated with the additional entity, from initiating the separate automated telephone call;

generating an additional notification that includes the result of the conversation with the representative or an additional result of the additional conversation with the additional representative; and
causing the additional notification to be rendered via the additional computing device of the user.

8. The method of claim 1, wherein requesting the availability of the given entity during the given time period comprises rendering of one or more corresponding instances of synthesized speech to request the availability of the given entity during the given time period.

9. The method of claim 1, wherein the received information indicates that the given entity is available during the given period of time, and wherein the notification that includes the result of the conversation indicates that the given entity is available during the given period of time.

10. The method of claim 9, further comprising:
in response to determining that the given entity is available during the given period of time:
requesting that the representative associated with the given entity hold the given time period, available for given entity, for the user,
wherein the notification that includes the result of the conversation further indicates the given time period, available for the given entity, is being held for the user.

11. The method of claim 9, wherein the notification further requests that the user join the automated telephone call.

12. The method of claim 9, further comprising:
in response to determining that the given entity is available during the given period of time, terminating performance of the additional automated telephone call with the additional entity.

13. The method of claim 1, wherein the received information indicates that the given entity is not available during the given period of time, and wherein the notification that includes the result of the conversation indicates that the given entity is not available during the given period of time.

14. The method of claim 13, further comprising:
in response to determining that the given entity is not available during the given period of time, terminating performance of the automated telephone call with the given entity.

15. The method of claim 1, wherein receiving the request to initiate performance of the automated telephone call on behalf of the user comprises one of:
receiving touch or typed input at the computing device of the user via a search interface or an automated assistant interface; or
receiving spoken input via one or more microphones of the computing device of the user.

16. The method of claim 1, wherein the representative associated with the given entity is one of: a human representative, or an additional automated assistant associated with the given entity.

17. A system comprising:
at least one processor; and
memory storing instructions that, when executed, cause the at least one processor to:
receive, from a computing device of a user, a request to initiate performance of an automated telephone call on behalf of the user;
identify, based on the request, an action to be performed during the automated telephone call;
identify, based on the action to be performed during the automated call, a group of entities that are each capable of satisfying the request, wherein the action to be performed during the automated telephone call comprises requesting availability of the entities of the group during a given period of time;

initiate, by an automated assistant, performance of the automated telephone call with a given entity, of the entities, of the group;

during performance of the automated telephone call with the given entity:

request, from a representative associated with the given entity, the availability of the given entity during the given period of time; and receive, from the representative associated with the given entity, information regarding the availability of the given entity during the given period of time; and initiate, by the automated assistant, performance of an additional automated telephone call with an additional entity, of the entities, of the group;

generate a notification that includes the availability of the given entity during the given period of time; and cause the notification to be rendered via the computing device of the user.

18. A non-transitory computer-readable storage medium storing instructions that, when executed, cause at least one processor to perform operations, the operations comprising:

receiving, from a computing device of a user, a request to initiate performance of an automated telephone call on behalf of the user;

identifying, based on the request, an action to be performed during the automated telephone call;

identifying, based on the action to be performed during the automated call, a group of entities that are each capable of satisfying the request, wherein the action to be performed during the automated telephone call comprises requesting availability of the entities of the group during a given period of time;

initiating, by an automated assistant, performance of the automated telephone call with a given entity, of the entities, of the group;

during performance of the automated telephone call with the given entity:

requesting, from a representative associated with the given entity, the availability of the given entity during the given period of time; and receiving, from the representative associated with the given entity, information regarding the availability of the given entity during the given period of time; and initiating, by the automated assistant, performance of an additional automated telephone call with an additional entity, of the entities, of the group;

generating a notification that includes the availability of the given entity during the given period of time; and causing the notification to be rendered via the computing device of the user.

\* \* \* \* \*